United States Patent
Ji et al.

(10) Patent No.: US 10,541,791 B2
(45) Date of Patent: Jan. 21, 2020

(54) TECHNIQUES FOR REDUCING LATENCY IN A WIRELESS COMMUNICATION SYSTEM

(71) Applicant: QUALCOMM Incorporated, San Diego, CA (US)

(72) Inventors: Tingfang Ji, San Diego, CA (US); Joseph Binamira Soriaga, San Diego, CA (US); Jing Jiang, San Diego, CA (US); John Edward Smee, San Diego, CA (US); Naga Bhushan, San Diego, CA (US); Kambiz Azarian Yazdi, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/689,853

(22) Filed: Apr. 17, 2015

(65) Prior Publication Data
US 2016/0150560 A1 May 26, 2016

Related U.S. Application Data

(60) Provisional application No. 62/084,090, filed on Nov. 25, 2014.

(51) Int. Cl.
*H04L 1/18* (2006.01)
*H04W 74/02* (2009.01)
(Continued)

(52) U.S. Cl.
CPC .......... *H04L 5/0007* (2013.01); *H04L 1/1861* (2013.01); *H04L 5/0055* (2013.01)

(58) Field of Classification Search
None
See application file for complete search history.

(56) References Cited

U.S. PATENT DOCUMENTS 6,885,674 B2 * 4/2005 Hunt .................. H04B 3/54
370/353
7,079,508 B2 * 7/2006 Ayyagari .............. H04L 1/1803
370/329

(Continued)

FOREIGN PATENT DOCUMENTS

CN          102215589 A       10/2011

OTHER PUBLICATIONS

Ericsson et al., "Latency Improvement Comparison," 3GPP TSG-RAN WG2 #67, R2-094825, Shenzhen, China, Aug. 24-28, 2009, 4 pgs., 3rd Generation Partnership Project.

(Continued)

*Primary Examiner* — Gregory B Sefcheck
(74) *Attorney, Agent, or Firm* — Holland & Hart LLP

(57) ABSTRACT

Methods, systems, and devices are described for wireless communication. In one method, a first transmission may be transmitted on a contention-based channel, and a scheduling request for the first transmission may be transmitted on a scheduled channel. The scheduling request may be transmitted prior to determining that an acknowledgment (ACK) message has been received for the first transmission. In another method, a scheduling request for a first transmission may be received on a scheduled channel from a wireless device. Upon decoding a reception of the first transmission on a contention-based channel, transmission of a transmission grant to the wireless device may be withheld. Upon failing to decode the reception of the first transmission on the contention-based channel, the transmission grant may be transmitted to the wireless device.

34 Claims, 21 Drawing Sheets

(51) Int. Cl.
*H04W 72/12* (2009.01)
*H04L 5/00* (2006.01)

(56) References Cited

U.S. PATENT DOCUMENTS

| | | | | |
|---|---|---|---|---|
| 7,120,852 B2* | 10/2006 | Terry | H04L 1/1685 | 714/746 |
| 7,328,026 B2* | 2/2008 | Gu | H04L 47/14 | 370/329 |
| 7,394,790 B2* | 7/2008 | Kim | H04B 7/0491 | 370/236 |
| 7,826,438 B1* | 11/2010 | Salhotra | H04L 1/1887 | 370/345 |
| 8,112,090 B2* | 2/2012 | Tanno | H04W 74/0833 | 370/329 |
| 8,238,312 B2* | 8/2012 | Gandham | H04L 1/1887 | 370/336 |
| 8,321,741 B2* | 11/2012 | Wei | H04L 1/16 | 714/749 |
| 8,401,018 B2* | 3/2013 | Meylan | H04L 47/14 | 370/395.4 |
| 8,615,696 B2* | 12/2013 | Kim | H04B 7/0491 | 370/333 |
| 8,625,505 B2* | 1/2014 | Haartsen | H04L 1/1887 | 370/329 |
| 8,687,541 B2* | 4/2014 | Lohr | H04L 5/0007 | 370/318 |
| 8,705,340 B2* | 4/2014 | Gong | H04L 1/0002 | 370/216 |
| 8,737,244 B2* | 5/2014 | Rotvold | H04B 17/345 | 370/252 |
| 8,737,336 B2* | 5/2014 | Lohr | H04W 72/042 | 370/329 |
| 8,799,733 B2* | 8/2014 | Kim | H04B 7/0491 | 714/748 |
| 8,837,411 B2* | 9/2014 | Wager | H04L 1/1812 | 370/329 |
| 8,842,514 B2* | 9/2014 | Zhang | H04B 7/12 | 370/208 |
| 8,902,930 B2* | 12/2014 | Vijayasankar | H04B 3/542 | 370/478 |
| 8,929,319 B2* | 1/2015 | Anderson | H04W 72/1284 | 370/329 |
| 8,971,283 B2* | 3/2015 | Higuchi | H04L 5/0005 | 370/330 |
| 9,179,474 B2* | 11/2015 | Torsner | H04W 74/02 | |
| 9,191,828 B2* | 11/2015 | Li | H04W 4/70 | |
| 9,203,566 B2* | 12/2015 | Terry | H04L 5/001 | |
| 9,277,533 B2* | 3/2016 | Rapaport | H04W 4/08 | |
| 9,294,959 B2* | 3/2016 | Seyama | H04L 1/1854 | |
| 9,307,536 B2* | 4/2016 | Zhang | H04B 7/12 | |
| 9,319,198 B2* | 4/2016 | Kim | H04L 5/0055 | |
| 9,397,945 B2* | 7/2016 | Han | H04W 24/10 | |
| 9,433,018 B2* | 8/2016 | Cai | H04W 74/0825 | |
| 9,516,496 B2* | 12/2016 | Guan | H04L 1/1887 | |
| 9,584,290 B2* | 2/2017 | Prakash | H04L 5/0064 | |
| 9,641,289 B2* | 5/2017 | Liu | H04L 1/1893 | |
| 9,722,760 B2* | 8/2017 | Stern-Berkowitz | H04W 72/1289 | |
| 9,768,942 B2* | 9/2017 | Golitschek Edler von Elbwart | H04W 72/0446 | |
| 9,847,855 B2* | 12/2017 | Siomina | H04L 1/189 | |
| 9,876,628 B2* | 1/2018 | Golitschek Edler von Elbwart | H04L 1/1854 | |
| 2004/0162083 A1 | 8/2004 | Chen et al. | | |
| 2005/0058151 A1* | 3/2005 | Yeh | H04W 52/46 | 370/445 |
| 2008/0318607 A1* | 12/2008 | Torsner | H04W 74/02 | 455/509 |
| 2010/0054145 A1* | 3/2010 | Frenger | H04W 72/085 | 370/252 |
| 2011/0243080 A1 | 10/2011 | Chen et al. | | |
| 2015/0085777 A1* | 3/2015 | Seok | H04W 52/0216 | 370/329 |

OTHER PUBLICATIONS

ISA/EPO, International Search Report and Written Opinion of the International Searching Authority, Int'l. App. No. PCT/US2015/058649, dated Feb. 8, 2016, European Patent Office, Rijswijk, NL, 15 pgs.

Huawei et al., "Downlink Control Channel Design for MTC UEs", 3GPP TSG-RAN WG1#78bis, R1-143717, 3GPP, Sep. 27, 2014, 6 Pages.

LG Electronics: "Contention Resolution in RRC Connected Mode", 3GPP TSG-RAN WG2#59bis, R2-074131, 3GPP, Oct. 2, 2007, 6 Pages.

Nokia Corporation et al., "SR Associated Contention Based Transmission", 3GPP TSG-RAN WG2#69, R2-101115, 3GPP, Feb. 16, 2010, 3 Pages.

Taiwan Search Report—TW104136070—TIPO—dated Mar. 31, 2019.

* cited by examiner

TECHNIQUES FOR REDUCING LATENCY IN A WIRELESS COMMUNICATION SYSTEM

CROSS REFERENCES

The present application for patent claims priority to U.S. Provisional Patent Application No. 62/084,090 by Ji et al., entitled "Techniques For Reducing Latency In A Wireless Communication System," filed Nov. 25, 2014, assigned to the assignee hereof, and expressly incorporated by reference herein.

BACKGROUND

Field of the Disclosure

The present disclosure, for example, relates to wireless communication systems, and more particularly to reducing the latency in a wireless communication system.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

In some cases, a wireless multiple-access communication system may be used for mission critical transmissions. Mission critical transmissions may include, for example, high-reliability moderate latency (HRML) transmissions or high-reliability low latency (HRLL) transmissions. HRML transmissions may include transmissions for which the latency expectation is order of magnitudes higher than a transmission time interval (TTI; e.g., a symbol duration) of the system. Examples of HRML transmissions include health care remote monitoring/treatment applications, or real-time process automation applications. HRLL transmissions may include transmissions for which the latency expectation is comparable to a TTI (e.g., a symbol duration) of the system. Examples of HRLL transmissions include tactile internet applications, closed loop control applications, drone flying applications, or smart grid system protection applications.

SUMMARY

The present disclosure generally relates to wireless communication systems, and more particularly to improved systems, methods, and devices for reducing the latency of uplink transmissions in a wireless communication system. In a Long Term Evolution (LTE) or LTE-Advanced (LTE-A) communication systems, a user equipment (UE) may initiate an uplink transmission by transmitting a scheduling request to a base station. The base station may process the scheduling request and, upon allocating resources for the uplink transmission, transmit an uplink grant to the UE. In response to receiving the uplink grant, the UE may transmit the uplink transmission to the base station according to the uplink grant. Subsequently, the base station may transmit an acknowledgement (ACK) message or non-acknowledgement (NAK) message to the UE, indicating whether the uplink transmission was successfully received and decoded. Upon receiving an uplink grant with the NAK message, the UE may retransmit the first transmission. A scheduling request delay is therefore incurred when a UE initiates an uplink transmission.

The present disclosure describes techniques in which a scheduling request delay may be eliminated, under some scenarios, by 1) transmitting a first transmission (e.g., a first uplink transmission) on a contention-based channel (e.g., a channel over which two or more devices may transmit in an unscheduled manner, possibly leading to transmission collisions), and 2) prior to determining that an acknowledgement (ACK) message has been received for the first transmission, transmitting a scheduling request for the first transmission on a scheduled channel. When a base station receives and decodes the first transmission, the base station may transmit an ACK message for the first transmission and ignore the scheduling request. Thus, a scheduling request delay may not be incurred, and the latency of the uplink transmission may be reduced, when the base station is able to decode a reception of the first transmission on the contention-based channel. When a base station receives the scheduling request, the base station may transmit a transmission grant (e.g., an uplink grant) to the UE, thus incurring a scheduling request delay.

In a first set of illustrative examples, a method for wireless communication is described. In one configuration, the method includes transmitting a first transmission on a contention-based channel, and transmitting a scheduling request for the first transmission on a scheduled channel. The scheduling request may be transmitted prior to determining that an ACK message has been received for the first transmission.

In some examples of the method, the first transmission and the scheduling request for the first transmission may be transmitted simultaneously. In some examples, the method may include receiving an ACK message for the first transmission subsequent to transmitting the scheduling request. In some examples, the method may include receiving a transmission grant in response to transmitting the scheduling request, and retransmitting the first transmission on the scheduled channel according to the transmission grant.

In some examples, the method may include repeating transmission of the first transmission on the contention-based channel following expiration of a wait time, and repeating transmission of the scheduling request for the first transmission on the scheduled channel in accordance with at least one of: contemporaneously with repeating transmission of the first transmission or a scheduling request transmission periodicity. In some examples, transmitting the first transmission on the contention-based channel and repeating transmission of the first transmission on the contention-based channel may be performed using different transmission parameters. In some examples, the wait time may commence based at least in part on one of: transmitting the first transmission or transmitting the scheduling request. In some examples, the expiration of the wait time may occur prior to receiving at least one of: an ACK message for the first transmission or a transmission grant.

In some examples, the method may include transmitting as part of the first transmission, on the contention-based channel, a request for transmission of a second transmission; receiving an ACK message for the first transmission; receiving a transmission grant in response to transmitting the request for transmission of the second transmission; and transmitting the second transmission on the scheduled channel according to the transmission grant. In some examples of the method, the scheduled channel may be a narrow-band channel. In some examples of the method, the first transmission on the contention-based channel may include at least one of: an orthogonal frequency division multiple access (OFDMA) transmission, a code division multiple access (CDMA) transmission, or a spatial division multiple access (SDMA) transmission. In some examples of the method, the contention-based channel may at least partially overlap, in time or frequency, a channel available for scheduled transmissions. In some examples of the method, the contention-based channel may not overlap, in time or frequency, a channel available for scheduled transmissions.

In a second set of illustrative examples, an apparatus for wireless communication is described. In one configuration, the apparatus may include means for transmitting a first transmission on a contention-based channel, and means for transmitting a scheduling request for the first transmission on a scheduled channel. The scheduling request may be transmitted prior to determining that an ACK message has been received for the first transmission. In some examples, the apparatus may further include means for implementing one or more aspects of the method for wireless communication described above with respect to the first set of illustrative examples.

In a third set of illustrative examples, another apparatus for wireless communication is described. In one configuration, the apparatus may include a processor, memory in electronic communication with the processor, and instructions stored in the memory. The instructions may be executable by the processor to transmit a first transmission on a contention-based channel, and to transmit a scheduling request for the first transmission on a scheduled channel. The scheduling request may be transmitted prior to determining that an ACK message has been received for the first transmission. In some examples, the instructions may also be executable by the processor to implement one or more aspects of the method for wireless communication described above with respect to the first set of illustrative examples.

In a fourth set of illustrative examples, a non-transitory computer-readable medium storing computer-executable code for wireless communication is described. In one configuration, the code may be executable by a processor to transmit a first transmission on a contention-based channel, and to transmit a scheduling request for the first transmission on a scheduled channel. The scheduling request may be transmitted prior to determining that an ACK message has been received for the first transmission. In some examples, the code may also be executable by the processor to implement one or more aspects of the method for wireless communication described above with respect to the first set of illustrative examples.

In a fifth set of illustrative examples, another method for wireless communication is described. In one configuration, the method may include receiving on a scheduled channel, from a wireless device, a scheduling request for a first transmission; withholding transmission of a transmission grant to the wireless device upon decoding a reception of the first transmission on a contention-based channel; and transmitting the transmission grant to the wireless device upon failing to decode the reception of the first transmission on the contention-based channel.

In some examples of the method, the reception of the first transmission may be decoded during a second attempt to decode the first transmission, and the method may further include withholding transmission of the transmission grant to the wireless device after failing a first attempt to decode the first transmission. In some examples of the method, the transmission grant may be transmitted to the wireless device upon failing to decode the reception of the first transmission during a second attempt to decode the first transmission, and the method may further include withholding transmission of the transmission grant to the wireless device after failing a first attempt to decode the first transmission.

In some examples, the method may include transmitting an ACK message for the first transmission upon decoding the reception of the first transmission on the contention-based channel. In some examples, the method may include receiving a retransmission of the first transmission, on the scheduled channel, according to the transmission grant.

In a sixth set of illustrative examples, an apparatus for wireless communication is described. In one configuration, the apparatus may include a processor, memory in electronic communication with the processor, and instructions stored in the memory. The instructions may be executable by the processor to receive on a scheduled channel, from a wireless device, a scheduling request for a first transmission, to withhold transmission of a transmission grant to the wireless device upon decoding a reception of the first transmission on a contention-based channel, and to transmit the transmission grant to the wireless device upon failing to decode the reception of the first transmission on the contention-based channel. In some examples, the instructions may also be executable by the processor to implement one or more aspects of the method for wireless communication described above with respect to the fifth set of illustrative examples.

In a seventh set of illustrative examples, another method for wireless communication is described. In one configuration, the method may include receiving on a contention-based channel, from a wireless device, a first transmission, the first transmission including a request for transmission of a second transmission. The method may also include transmitting, to the wireless device, an ACK message for the first transmission, and a transmission grant for transmission of the second transmission on a scheduled channel.

In an eighth set of illustrative examples, an apparatus for wireless communication is described. In one configuration, the apparatus may include a processor, memory in electronic communication with the processor, and instructions stored in the memory. The instructions may be executable by the processor to receive on a contention-based channel, from a wireless device, a first transmission, the first transmission including a request for transmission of a second transmission, and to transmit, to the wireless device, an ACK message for the first transmission and a transmission grant for transmission of the second transmission on a scheduled channel. In some examples, the instructions may also be executable by the processor to implement one or more aspects of the method for wireless communication described above with respect to the seventh set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The described features generally relate to improved systems, methods, or devices for low latency communication in a wireless communication system. More particularly, and to avoid the delay introduced by a scheduling request during certain types of transmissions (e.g., hybrid automatic repeat request (HARQ)-based uplink transmissions), a transmission (e.g., from a user equipment (UE) to a base station) may be made on a contention-based channel. However, because there is a chance (e.g., an x % probability) that the transmission will collide with another transmission on the contention-based channel, thus requiring a retransmission, increasing latency, and decreasing reliability, a scheduling request for the transmission may be made, and sometimes simultaneously made, on a scheduled channel. When the transmission is received and decoded (e.g., by a base station), the scheduling request may be ignored and does not add a scheduling request delay to the transmission. When the transmission is not received or not decoded (e.g., because of a collision on the contention-based channel, or for other reasons), a transmission grant may be provided for retransmission of the transmission on the scheduled channel. Thus, the latency of the transmission may be decreased under some scenarios, and in a worst case scenario is no greater than the latency would have been without implementing one or more of the techniques described herein.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
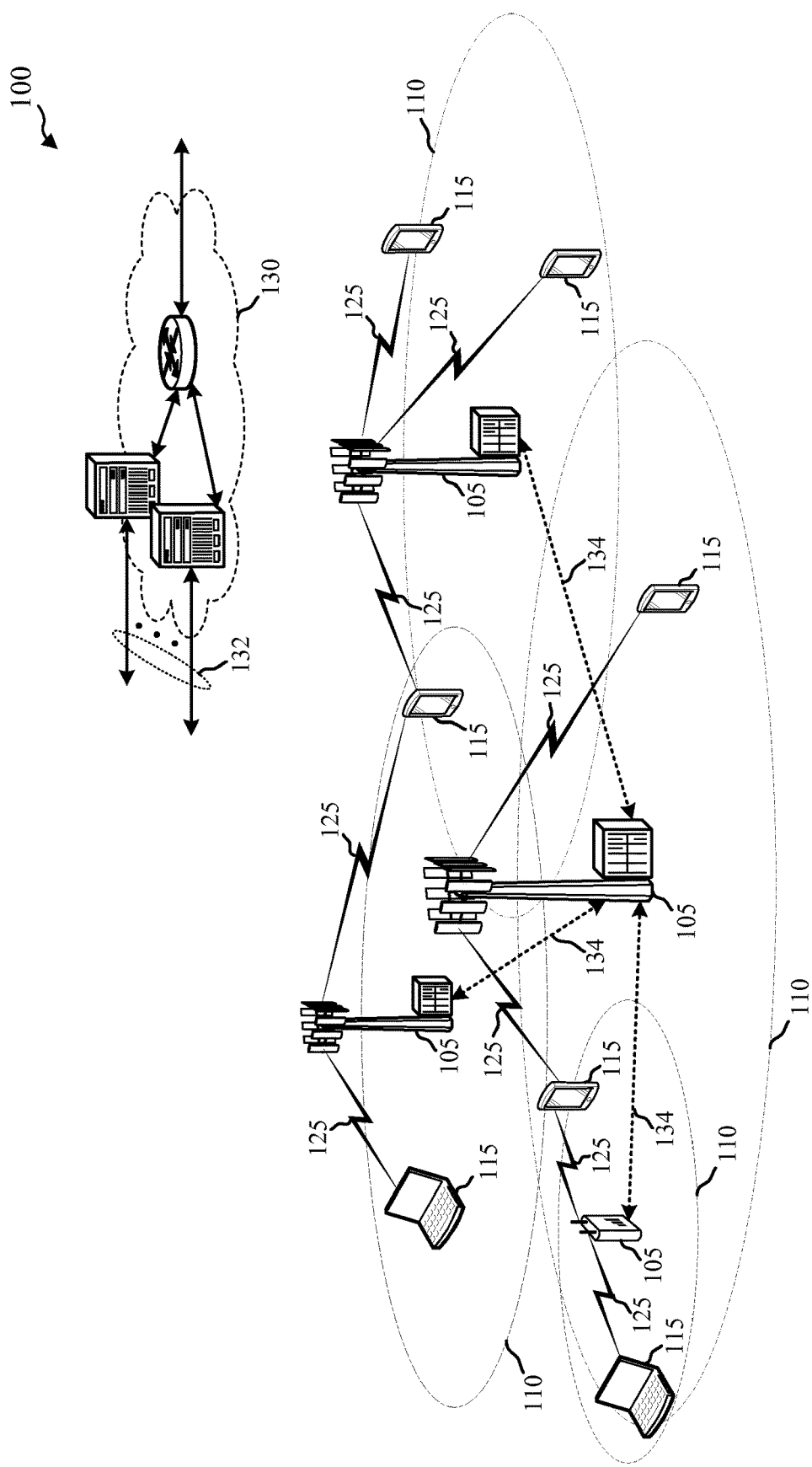
FIG. 1 illustrates an example of a wireless communication system in accordance with various aspects of the present disclosure.

FIG. 1 illustrates an example of a wireless communication system 100 in accordance with various aspects of the present disclosure. The wireless communication system 100 may include one or more base stations 105, one or more UEs 115, and a core network 130. The core network 130 may provide user authentication, access authorization, tracking, internet protocol (IP) connectivity, and other access, routing, or mobility functions. The base stations 105 may interface with the core network 130 through backhaul links 132 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 130), with one another over backhaul links 134 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may be or include a Long Term Evolution (LTE) or LTE-Advanced (LTE-A) network. In LTE/LTE-A networks, the term evolved node B (eNB) may be generally used to describe the base stations 105, while the term UE may be generally used to describe the UEs 115. The wireless communication system 100 may be a heterogeneous LTE/LTE-A network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 115 with service subscriptions with the network provider. A small cell may include a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system 100 may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

The communication networks that may accommodate some of the various disclosed examples may be packet-based networks that operate according to a layered protocol stack and data in the user plane may be based on the IP. A radio link control (RLC) layer may perform packet segmentation and reassembly to communicate over logical channels. A medium access control (MAC) layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and the base stations 105. The RRC protocol layer may also be used for core network 130 support of radio bearers for the user plane data. At the physical (PHY) layer, the transport channels may be mapped to physical channels.

The use of HARQ may help ensure that data is received correctly over a wireless communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits may not be added to each transmission, but may be retransmitted after the transmitter of the original message receives a NAK message indicating a failed attempt to decode a transmission.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The wireless communication links 125 shown in wireless communication system 100 may carry UL transmissions from a UE 115 to a base station 105, or downlink (DL) transmissions, from a base station 105 to a UE 115. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

In some embodiments of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Time intervals in LTE may be expressed in multiples of a basic time unit (e.g., the sampling period, $T_s=1/30,720,000$ seconds). Time resources may be organized according to radio frames of length of 10 ms ($T_f=307200 \cdot T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a transmission time interval (TTI). In other cases, a TTI may be shorter than a subframe or may be dynamically selected (e.g., in short TTI bursts or in selected component carriers using short TTIs).

Figure 2:
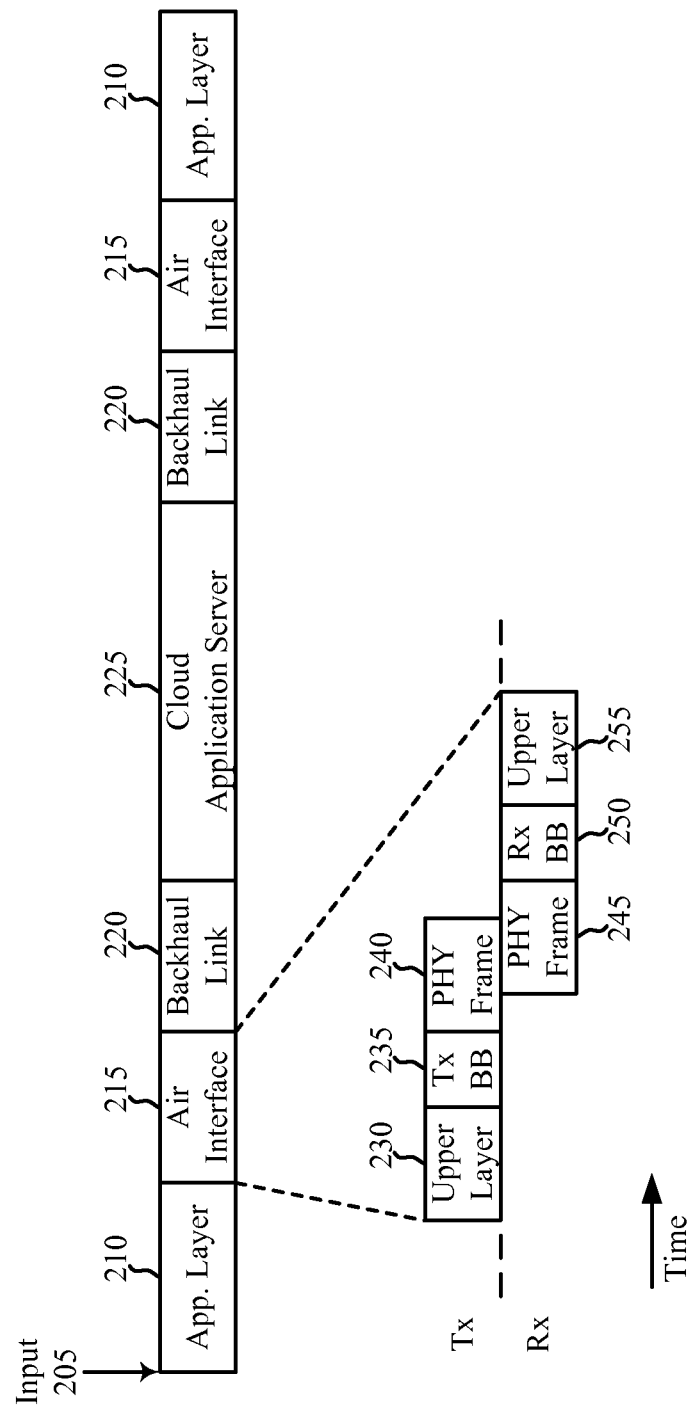
FIG. 2 shows an exemplary timeline of a round trip communication between a UE and an application server, in accordance with various aspects of the present disclosure.

FIG. 2 shows an exemplary timeline 200 of a round trip communication between a UE and an application server, in accordance with various aspects of the present disclosure. In some examples, the round trip communication may be initiated by one of the UEs 115 described with reference to FIG. 1. The communication may begin with an input 205 being received or applied to a UE. By way of example, the input 205 may include a sensor reading, a photo, a video frame, or user input (e.g., a keyboard entry or touchscreen selection). The input 205 may be processed at an application layer 210. The application layer 210 may, in turn, invoke an air interface 215 to make an uplink transmission to an application server. In some examples, the application server may be an entity within the cloud 225.

The air interface 215 may include an interface between the UE and a base station (e.g., one of the base stations 105 described with reference to FIG. 1). By way of example, the air interface 215 is shown in FIG. 2 to include a transmit portion and a receive portion. The transmit portion (e.g., at the UE) may include an upper layer 230, transmission baseband (Tx BB) resources 235, and a PHY layer frame 240 through which the uplink transmission may be processed. Similarly, the receive portion (e.g., at the base station) may include a PHY layer frame 245, reception baseband (Rx BB) resources 250, and an upper layer 255 through which the uplink transmission may be processed. After receiving and decoding the uplink transmission at the base station, the base station may forward the uplink transmission to a core network (e.g., part or all of the cloud 225) over a backhaul link 220. The backhaul link 220 may be an example of one of the backhaul links 132 described with reference to FIG. 1, and the core network may be an example of the core network 130 described with reference to FIG. 1. Upon receiving the uplink transmission, an application server or other entity within the cloud 225 may generate a response (e.g., a response to the input 205). The response may then be forwarded back to the base station over the backhaul link 220, for transmission to the UE in a downlink transmission over the air interface 215. The application layer 210 may then apply the response at the UE.

In the case of some round trip communications, such as high-reliability moderate latency (HRML) and high-reliability low latency (HRLL) communications, it may be desirable to reduce the end-to-end latency of the round trip communication. It may also be desirable to reduce the end-to-end latency of round trip communications between the UE and the base station. The present disclosure therefore describes techniques for reducing latency in the air interface 215, and more particularly, techniques for reducing latency in the air interface 215 when transmitting an uplink transmission from the UE to the cloud 225.

As previously discussed, a UE operating in an LTE/LTE-A communication system may initiate an uplink transmission (e.g., a HARQ-based uplink transmission) by transmitting a scheduling request to a base station. The base station may process the scheduling request and, upon allocating resources for the uplink transmission, transmit an uplink grant to the UE. In response to receiving the uplink grant, the UE may transmit the uplink transmission to the base station according to the uplink grant. Subsequently, the base station may transmit an acknowledgement (ACK) message or non-acknowledgement (NAK) message to the UE, indicating whether the uplink transmission was successfully received and decoded. Upon receiving an uplink grant with the NAK message, the UE may retransmit the first transmission. A scheduling request delay is therefore incurred when a UE initiates an uplink transmission. One way to reduce latency in the air interface 215 is to eliminate the scheduling request delay. Techniques for eliminating the scheduling request delay under at least some scenarios are described in the present disclosure.

Figure 3:
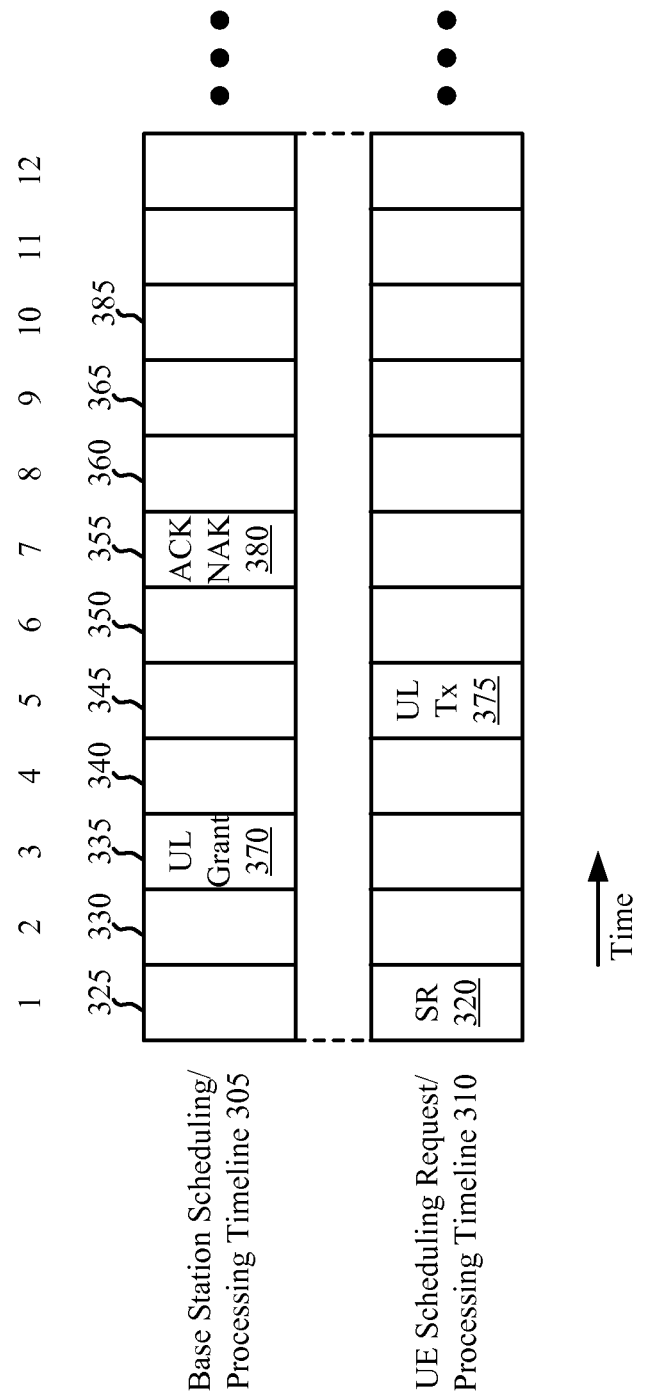
FIG. 3 shows an exemplary timeline of a HARQ-based uplink transmission, from a UE to a base station, in accordance with various aspects of the present disclosure.

FIG. 3 shows an exemplary timeline 300 of a HARQ-based uplink transmission, from a UE to a base station, in accordance with various aspects of the present disclosure. In some examples, the UE may be one of the UEs 115 described with reference to FIG. 1, and the base station may be one of the base stations 105 described with reference to FIG. 1. In some examples, the UE and base station may communicate using an air interface such as the air interface 215 described with reference to FIG. 2.

The timeline 300 includes a base station scheduling/processing timeline 305 and a UE scheduling request/processing timeline 310. Each of the base station scheduling/processing timeline 305 and the UE scheduling request/processing timeline 310 may be divided into a plurality of transmission time intervals (TTIs) over an air interface. In some examples, the TTIs may correspond to subframes of a radio frame (e.g., subframes of an LTE/LTE-A radio frame). In other examples, the TTIs may correspond to symbols of one or more subframes of a radio frame. In other examples, some of the TTIs may have durations that differ from the durations of other TTIs.

By way of example, the UE may transmit a scheduling request 320 during a first TTI 325. The base station may receive and process the scheduling request 320 during a second TTI 330 following the first TTI 325. The base station may transmit an uplink grant (UL Grant) 370 to the UE during a third TTI 335 following the second TTI 330. The UE may receive and decode the uplink grant 370 during a fourth TTI 340 following the third TTI 335. The UE may transmit a first uplink transmission (UL Tx) 375 during a fifth TTI 345 following the fourth TTI 340. The base station may receive and process the first uplink transmission 375 during a sixth TTI 350 following the fifth TTI 345. The base station may transmit an ACK message or NAK message (ACK/NAK) 380, and when necessary, an additional uplink grant, to the UE during a seventh TTI 355 following the sixth TTI 350. The UE may receive and decode the ACK message or NAK message, and optionally the additional uplink grant, during an eighth TTI 360 following the seventh TTI 355. When the UE receives an ACK message during the eighth TTI 360, the UE may transmit a second uplink transmission to the base station during a ninth TTI 365 following the eighth TTI 360. When the UE receives a NAK message during the eighth TTI 360, the UE may retransmit the first transmission to the base station during the ninth TTI 365. The base station may receive and process the second uplink transmission or retransmission of the first uplink transmission during a tenth TTI 385 following the ninth TTI 365. The UE and base station may continue in such a manner until the UE has completed its uplink transmissions, or until an uplink transmission period has expired.

Under a best case scenario, the HARQ-based uplink transmission described with reference to FIG. 3 is associated with a six TTI delay (e.g., from transmission of the scheduling request by the UE to receipt of the first uplink transmission by the base station). Under a best case one retransmission scenario, the HARQ-based uplink transmission described with reference to FIG. 3 is associated with a ten TTI delay. Under scenarios in which the first uplink transmission spans more than one TTI, these delays could be longer.

Under any scenario, the HARQ-based uplink transmission described with reference to FIG. 3 is associated with a scheduling request delay (i.e., the delay before transmitting the first uplink transmission) of four TTIs. FIGS. 4-21 describe techniques, including systems, methods, and devices, for eliminating the scheduling request delay under some scenarios. With reference to the exemplary timeline 300 described with reference to FIG. 3, this reduces the delay before the base station receives the first transmission of the UE to one TTI.

FIGS. 4-9 describe various scenarios in which a scheduling request delay may (FIGS. 4, 7, and 8) or may not (FIGS. 5, 6, and 9) be eliminated prior to transmitting a first transmission. In some examples, the techniques described with reference to the various scenarios may be applied to HMRL or HRLL transmissions. In some examples, the techniques may be applied to uplink transmissions. In some examples, the techniques may be applied to HARQ-based transmissions. In some examples, the techniques may be applied to LTE/LTE-A transmissions. The techniques may also or alternatively be applied to other types of transmissions.

Figure 4:
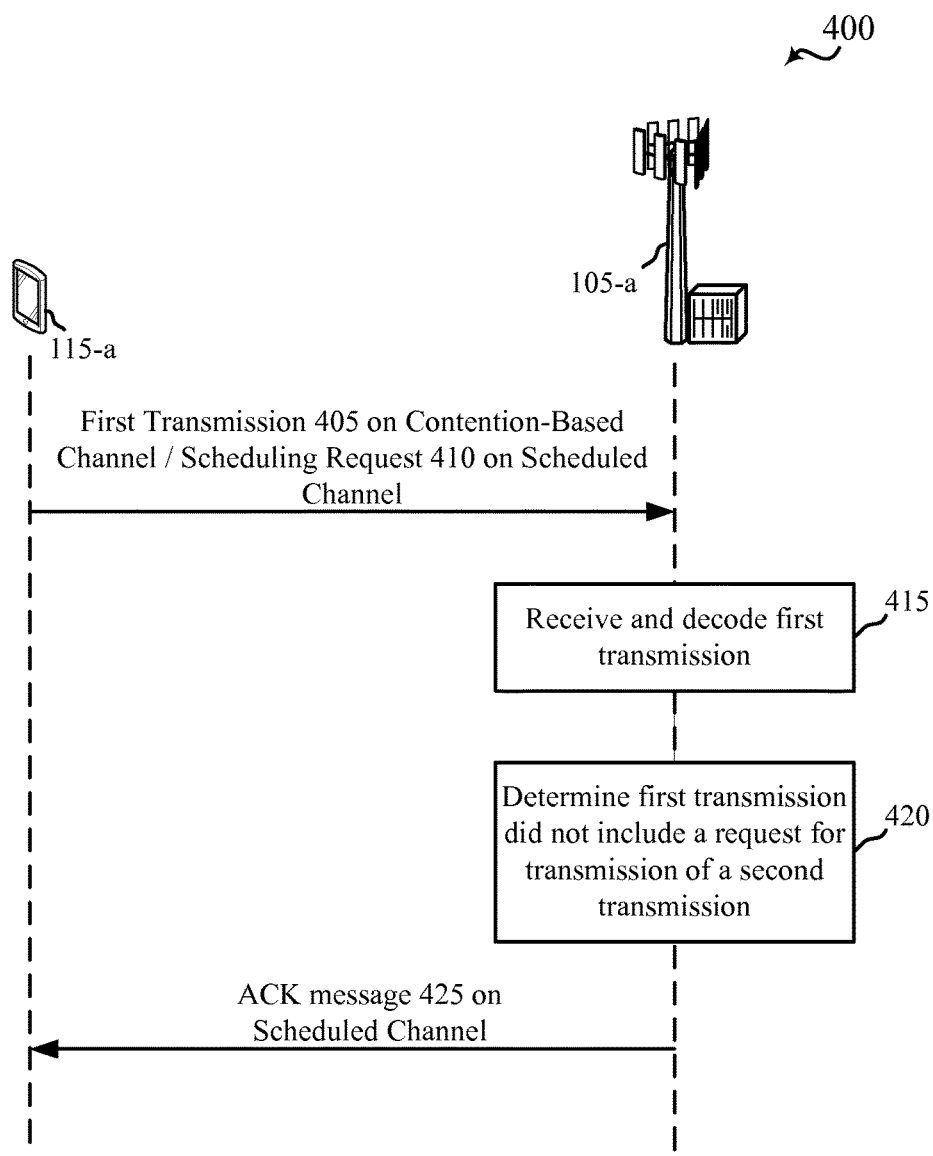
FIG. 4 shows a communication flow between a UE and a base station, in accordance with various aspects of the present disclosure.

FIG. 4 shows a communication flow 400 between a UE 115-a and a base station 105-a, in accordance with various aspects of the present disclosure. The UE 115-a may be an example of aspects of one or more of the UEs 115 described with reference to FIG. 1. The base station 105-a may be an example of aspects of one or more of the base stations 105 described with reference to FIG. 1.

The communication flow 400 may begin with the UE 115-a transmitting a first transmission 405, and a scheduling request 410 for the first transmission, to the base station 105-a. The first transmission 405 may be transmitted on a contention-based channel.

The scheduling request 410 may be transmitted on a scheduled channel. The scheduling request 410 may be transmitted before, after, or simultaneously with the first transmission 405, but prior to determining that an ACK message has been received for the first transmission 405. In some configurations, the scheduled channel may be a narrow-band channel (e.g., a channel having a payload that is substantially smaller than the payload of the first transmission 405, regardless of the physical bandwidth of the narrow-band channel (which physical bandwidth may be narrow or wide)).

At block 415, the base station 105-a may receive and decode the first transmission 405. Upon receiving and decoding the first transmission 405, the scheduling request 410 for the first transmission is rendered moot and may be ignored by the base station 105-a.

At block 420, the base station 105-a may determine that the first transmission 405 did not include a request for transmission of a second transmission (e.g., that the first transmission 405 did not include a scheduling request).

In response to receiving and decoding the first transmission 405, and determining that the first transmission 405 did not include a request for transmission of a second transmission, the base station 105-a may transmit an acknowledgement (ACK) message 425 to the UE 115-a. Subsequent to transmission of the ACK message 425, the communication flow 400 may end or continue with the performance of other operations by the UE 115-a or base station 105-a.

Figure 5:
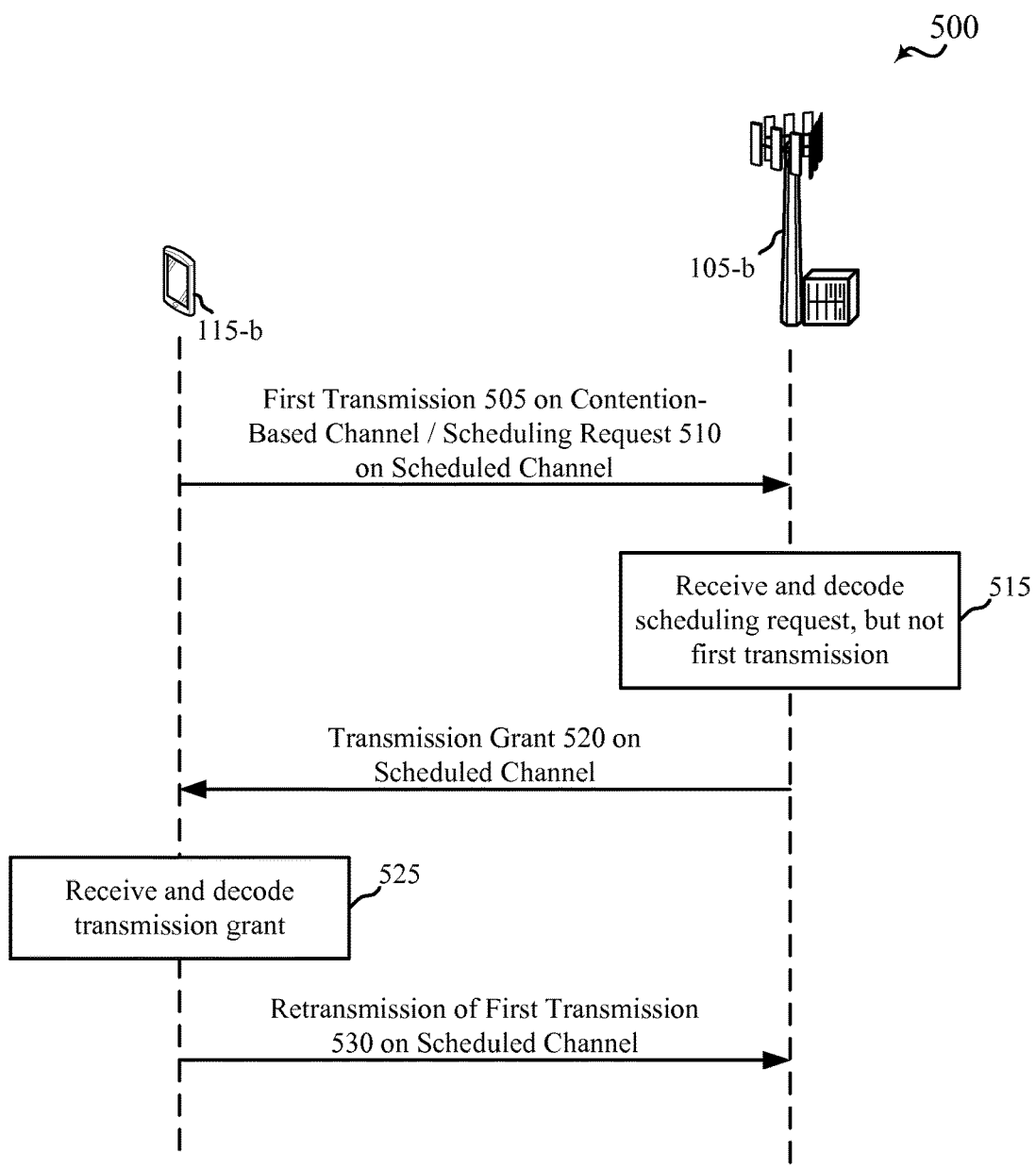
FIG. 5 shows a communication flow between a UE and a base station, in accordance with various aspects of the present disclosure.

FIG. 5 shows a communication flow 500 between a UE 115-b and a base station 105-b, in accordance with various aspects of the present disclosure. The UE 115-b may be an example of aspects of one or more of the UEs 115 described with reference to FIG. 1 or 4. The base station 105-b may be an example of aspects of one or more of the base stations 105 described with reference to FIG. 1 or 4.

The communication flow 500 may begin with the UE 115-b transmitting a first transmission 505, and a scheduling request 510 for the first transmission, to the base station 105-b. The first transmission 505 may be transmitted on a contention-based channel.

The scheduling request 510 may be transmitted on a scheduled channel. The scheduling request 510 may be transmitted before, after, or simultaneously with the first transmission 505, but prior to determining that an ACK message has been received for the first transmission 505. In some configurations, the scheduled channel may be a narrow-band channel (e.g., a channel having a payload that is substantially smaller than the payload of the first transmission 505, regardless of the physical bandwidth of the narrow-band channel (which physical bandwidth may be narrow or wide)).

At block 515, the base station 105-b may not receive, or receive and be unable to decode, the first transmission 505. However, the base station 105-b may receive and decode the scheduling request 510 for the first transmission.

In response to receiving and decoding the scheduling request 510, the base station 105-b may transmit a transmission grant (e.g., an uplink grant) 520 to the UE 115-*b*. The transmission grant 520 may allocate resources for retransmitting the first transmission on the scheduled channel.

At block 525, the UE 115-*b* may receive and decode the transmission grant 520. The UE 115-*b* may then retransmit the first transmission on the scheduled channel, according to the transmission grant (e.g., as retransmission 530). Subsequent to the retransmission 530, the communication flow 500 may end or continue with the performance of other operations (e.g., HARQ operations) by the UE 115-*b* or base station 105-*b*.

Figure 6:
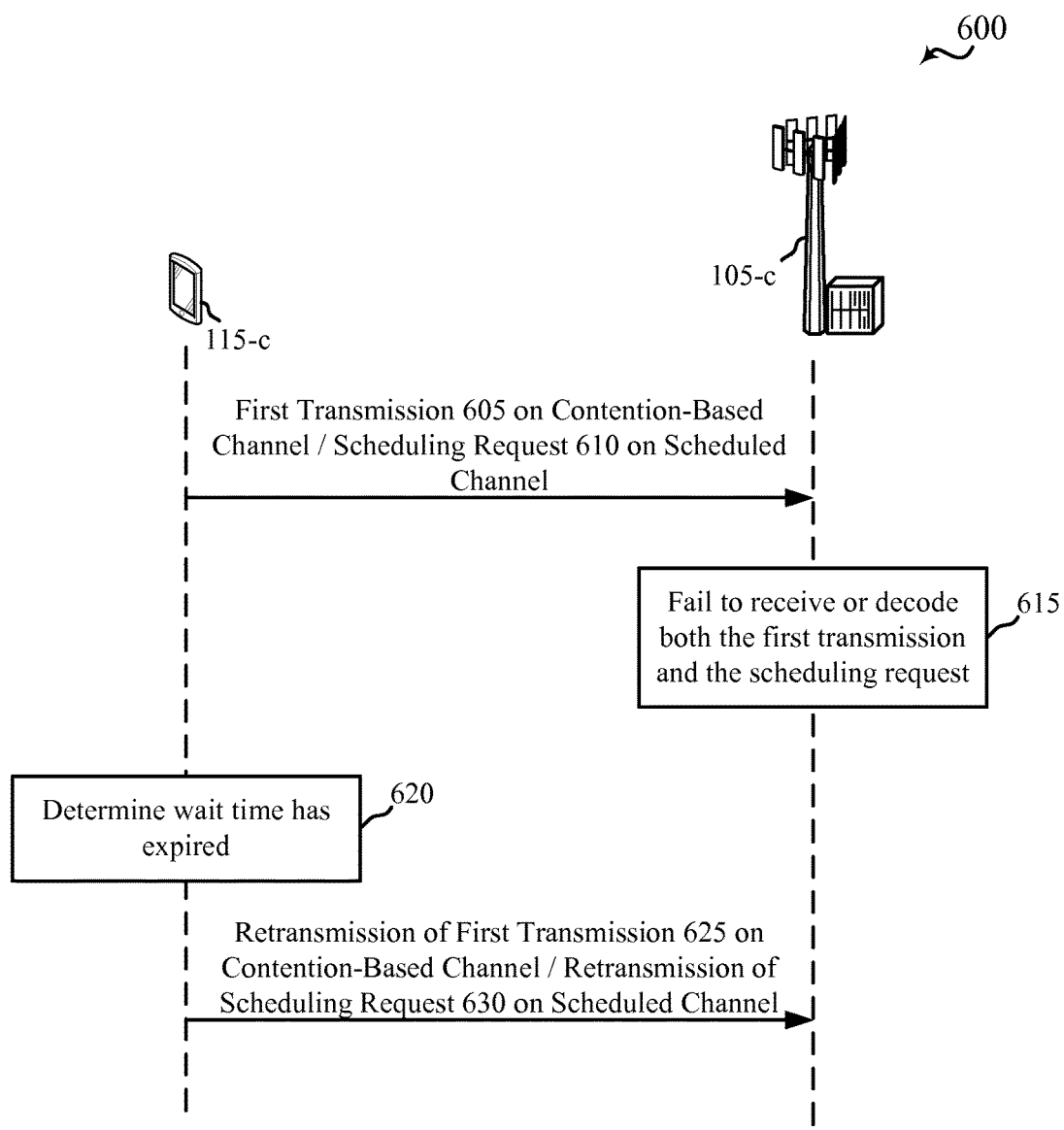
FIG. 6 shows a communication flow between a UE and a base station, in accordance with various aspects of the present disclosure.

FIG. 6 shows a communication flow 600 between a UE 115-*c* and a base station 105-*c*, in accordance with various aspects of the present disclosure. The UE 115-*c* may be an example of aspects of one or more of the UEs 115 described with reference to FIG. 1, 4, or 5. The base station 105-*c* may be an example of aspects of one or more of the base stations 105 described with reference to FIG. 1, 4, or 5.

The communication flow 600 may begin with the UE 115-*c* transmitting a first transmission 605, and a scheduling request 610 for the first transmission, to the base station 105-*c*. The first transmission 605 may be transmitted on a contention-based channel.

The scheduling request 610 may be transmitted on a scheduled channel. The scheduling request 610 may be transmitted before, after, or simultaneously with the first transmission 605, but prior to determining that an ACK message has been received for the first transmission 605. In some configurations, the scheduled channel may be a narrow-band channel (e.g., a channel having a payload that is substantially smaller than the payload of the first transmission 605, regardless of the physical bandwidth of the narrow-band channel (which physical bandwidth may be narrow or wide)).

At block 615, the base station 105-*c* may fail to receive, or receive and be unable to decode, the first transmission 605. The base station 105-*c* may also fail to receive, or receive and be unable to decode, the scheduling request 610 for the first transmission. As a result, the base station 105-*c* may not transmit, to the UE 115-*c*, an ACK message for the first transmission or a transmission grant for the first transmission.

At block 620, the UE 115-*c* may determine that a wait time has expired prior to receiving at least one of an ACK message for the first transmission or a transmission grant for the first transmission. In some embodiments, the wait time may commence based at least in part on transmitting the first transmission 605 or transmitting the scheduling request 610.

In response to expiration of the wait time, the UE 115-*c* may retransmit the first transmission 605 on the contention-based channel (e.g., as retransmission 625) and retransmit the scheduling request 610 on the scheduled channel (e.g., as retransmission 630). In some instances, the scheduling request may be retransmitted on the scheduled channel contemporaneously with repeating transmission of the first transmission. In other instances, the scheduling request may be retransmitted in accordance with a scheduling request transmission periodicity. In some cases, the UE 115-*c* may select different transmission parameters for retransmitting the first transmission or the scheduling request. Subsequent to transmitting the retransmissions 625 and 630, the communication flow 600 may end or continue with the performance of other operations by the UE 115-*c* or base station 105-*c*.

Figure 7:
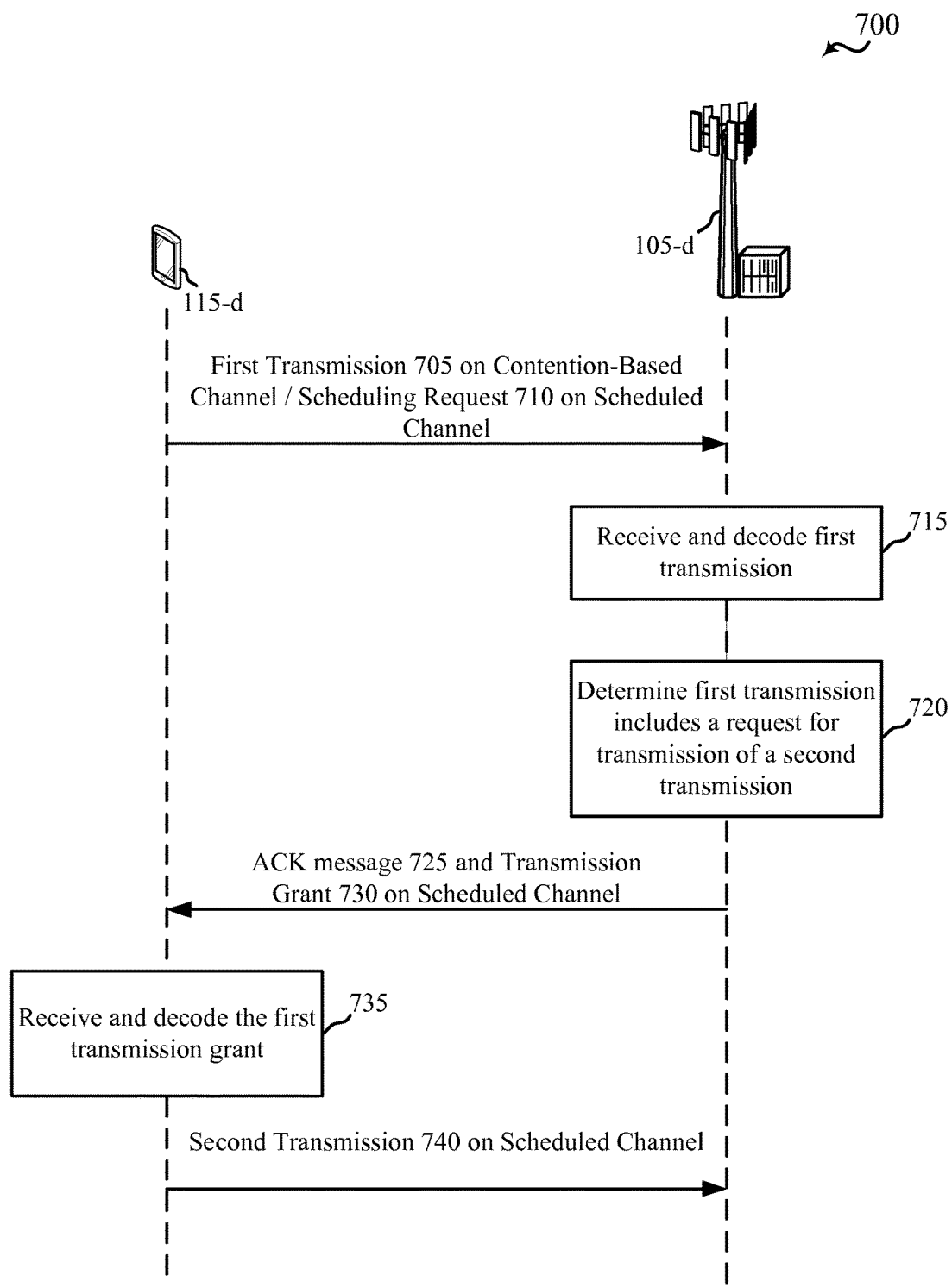
FIG. 7 shows a communication flow between a UE and a base station, in accordance with various aspects of the present disclosure.

FIG. 7 shows a communication flow 700 between a UE 115-*d* and a base station 105-*d*, in accordance with various aspects of the present disclosure. The UE 115-*d* may be an example of aspects of one or more of the UEs 115 described with reference to FIG. 1, 4, 5, or 6. The base station 105-*d* may be an example of aspects of one or more of the base stations 105 described with reference to FIG. 1, 4, 5, or 6.

The communication flow 700 may begin with the UE 115-*d* transmitting a first transmission 705, and a scheduling request 710 for the first transmission, to the base station 105-*d*. The first transmission 705 may be transmitted on a contention-based channel.

The scheduling request 710 may be transmitted on a scheduled channel. The scheduling request 710 may be transmitted before, after, or simultaneously with the first transmission 705, but prior to determining that an ACK message has been received for the first transmission 705. In some configurations, the scheduled channel may be a narrow-band contention-free channel (e.g., a channel having a payload that is substantially smaller than the payload of the first transmission 705, regardless of the physical bandwidth of the narrow-band channel (which physical bandwidth may be narrow or wide)).

At block 715, the base station 105-*d* may receive and decode the first transmission 705. Upon receiving and decoding the first transmission 705, the scheduling request 710 for the first transmission is rendered moot and may be ignored by the base station 105-*d*.

At block 720, the base station 105-*d* may determine that a request for transmission of a second transmission (e.g., a scheduling request) was transmitted as part of the first transmission 705 (e.g., transmitted in a MAC header of the first transmission 705).

In response to receiving and decoding the first transmission 705, and determining that the first transmission 705 includes a request for transmission of a second transmission, the base station 105-*d* may transmit an acknowledgement (ACK) message 725, and a transmission grant 730 for the second transmission, to the UE 115-*d*.

At block 735, the UE 115-*d* may receive and decode the transmission grant 730. The UE 115-*d* may then transmit the second transmission 740 on the scheduled channel, according to the transmission grant. Subsequent to transmitting the second transmission 740, the communication flow 700 may end or continue with the performance of other operations (e.g., HARQ operations) by the UE 115-*d* or base station 105-*d*.

Figure 8:
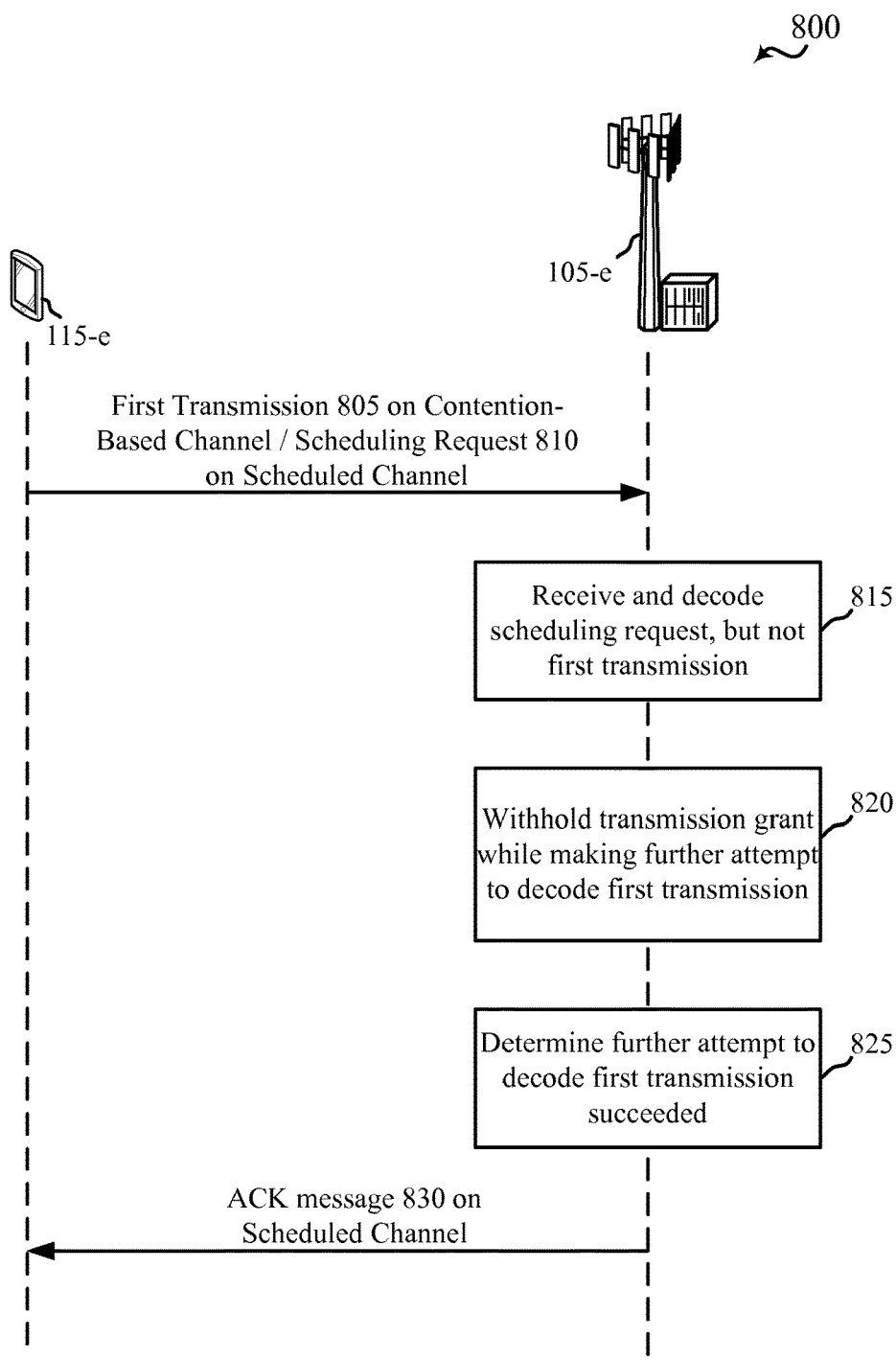
FIG. 8 shows a communication flow between a UE and a base station, in accordance with various aspects of the present disclosure.

FIG. 8 shows a communication flow 800 between a UE 115-*e* and a base station 105-*e*, in accordance with various aspects of the present disclosure. The UE 115-*e* may be an example of aspects of one or more of the UEs 115 described with reference to FIG. 1, 4, 5, 6, or 7. The base station 105-*e* may be an example of aspects of one or more of the base stations 105 described with reference to FIG. 1, 4, 5, 6, or 7.

The communication flow 800 may begin with the UE 115-*e* transmitting a first transmission 805, and a scheduling request 810 for the first transmission, to the base station 105-*e*. The first transmission 805 may be transmitted on a contention-based channel.

The scheduling request 810 may be transmitted on a scheduled channel. The scheduling request 810 may be transmitted before, after, or simultaneously with the first transmission 805, but prior to determining that an ACK message has been received for the first transmission 805. In some configurations, the scheduled channel may be a narrow-band channel (e.g., a channel having a payload that is substantially smaller than the payload of the first transmission 805, regardless of the physical bandwidth of the narrow-band channel (which physical bandwidth may be narrow or wide)).

At block 815, the base station 105-e may fail to receive, or receive and be unable to decode, the first transmission 805. However, the base station 105-e may receive and decode the scheduling request 810 for the first transmission.

At block 820, the base station 105-e may withhold transmission of a transmission grant to the UE 115-e while the base station 105-e makes another attempt to decode the first transmission 805. In some cases, information obtained from the scheduling request 810 may assist the base station 105-e in decoding the first transmission 805.

At block 825, it may be determined that the further attempt to decode the first transmission 805 succeeded, in which case the base station 105-e may withhold transmission of the transmission grant and transmit an acknowledgement (ACK) message 830 to the UE 115-e. When the first transmission 805 includes a request for transmission of a second transmission (e.g., a scheduling request), the base station 105-e may also transmit a transmission grant for the second transmission to the UE 115-e. Subsequent to transmission of the ACK message 830, the communication flow 800 may end or continue with the performance of other operations by the UE 115-e or base station 105-e.

Figure 9:
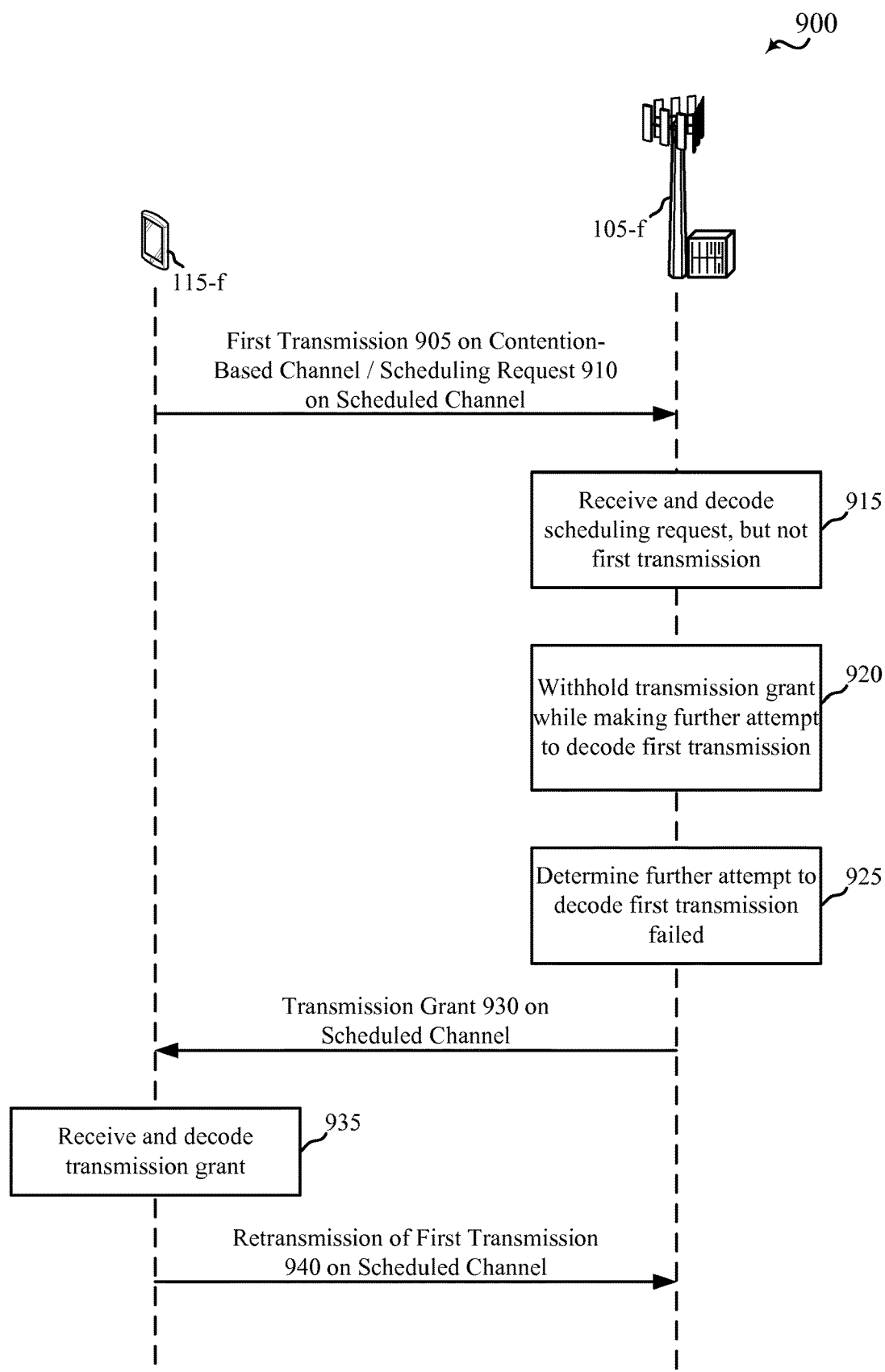
FIG. 9 shows a communication flow between a UE and a base station, in accordance with various aspects of the present disclosure.

FIG. 9 shows a communication flow 900 between a UE 115-f and a base station 105-f, in accordance with various aspects of the present disclosure. The UE 115-f may be an example of aspects of one or more of the UEs 115 described with reference to FIG. 1, 4, 5, 6, 7, or 8. The base station 105-f may be an example of aspects of one or more of the base stations 105 described with reference to FIG. 1, 4, 5, 6, 7, or 8.

The communication flow 900 may begin with the UE 115-f transmitting a first transmission 905, and a scheduling request 910 for the first transmission, to the base station 105-f. The first transmission 905 may be transmitted on a contention-based channel.

The scheduling request 910 may be transmitted on a scheduled channel. The scheduling request 910 may be transmitted before, after, or simultaneously with the first transmission 905, but prior to determining that an ACK message has been received for the first transmission 905. In some configurations, the scheduled channel may be a narrow-band channel (e.g., a channel having a payload that is substantially smaller than the payload of the first transmission 905, regardless of the physical bandwidth of the narrow-band channel (which physical bandwidth may be narrow or wide)).

At block 915, the base station 105-f may fail to receive, or receive and be unable to decode, the first transmission 905. However, the base station 105-f may receive and decode the scheduling request 910 for the first transmission.

At block 920, the base station 105-f may withhold transmission of a transmission grant to the UE 115-f while the base station 105-f makes another attempt to decode the first transmission 905. In some cases, information obtained from the scheduling request 910 may assist the base station 105-f in decoding the first transmission 905.

At block 925, it may be determined that the further attempt to decode the first transmission 905 failed, in which case the base station 105-f may transmit a transmission grant (e.g., an uplink grant) 930 to the UE 115-f. The transmission grant 930 may allocate resources for retransmitting the first transmission on the scheduled channel.

At block 935, the UE 115-f may receive and decode the transmission grant 930. The UE 115-f may then retransmit the first transmission on the scheduled channel, according to the transmission grant (e.g., as retransmission 940). Subsequent to the retransmission 940, the communication flow 900 may end or continue with the performance of other operations (e.g., HARQ operations) by the UE 115-f or base station 105-f.

In some embodiments of the communication flow described with reference to FIG. 4, 5, 6, 7, 8, or 9, the first transmission may be transmitted as an OFDMA transmission, a CDMA transmission, or a spatial division multiple access (SDMA) transmission. An OFDMA transmission may be useful when transmitting a large payload with light loading. A CDMA transmission may be useful when transmitting a small payload, and may enable a multiplexing of parallel transmissions. In some embodiments, the first transmission may be transmitted as a CDMA transmission, and a retransmission of the first transmission, when transmitted, may be transmitted as an OFDMA transmission.

In some embodiments of the communications flow described with reference to FIG. 4, 5, 6, 7, 8, or 9, the contention-based channel may at least partially overlap, in time or frequency, a channel available for scheduled transmissions. When the contention-based channel is only used for HRLL transmissions, the HRLL transmissions may occur at a relative low duty cycle, and thus, the channel may be available for scheduled transmissions much of the time. Resources may be selected or allocated for the contention-based channel such that the likelihood of a transmission on the contention-based resources being received and decoded by a base station is increased. Power control and rate control (e.g., a low rate modulation and coding scheme (MCS) may also, or alternatively, be used to increase the chance that a transmission on the contention-based channel will be received and decoded by a base station. In some cases, resources with a low rise over thermal (ROT) may be prioritized for the contention-based channel. In other configurations, the contention-based channel may include a channel that does not overlap, in time or frequency, a channel available for scheduled transmissions.

In some embodiments of the communication flow described with reference to FIG. 5, 7, or 9, an indication may be used to identify a need for the retransmission of the first transmission, so that the retransmission of the first transmission (which first transmission was initially transmitted on a contention-based channel) does not collide with a regularly-scheduled transmission or retransmission on a scheduled channel. In some cases, the indication may cause the regularly-scheduled transmission or retransmission to be suspended in favor or first retransmitting the first transmission (e.g., because the first transmission may be an HRML or HRLL transmission and the regularly-scheduled transmission may be assumed to be of less importance). In other cases, the indication may cause a UE to multiplex the retransmission of the first transmission with regularly-scheduled transmissions or retransmissions.

Figure 10:
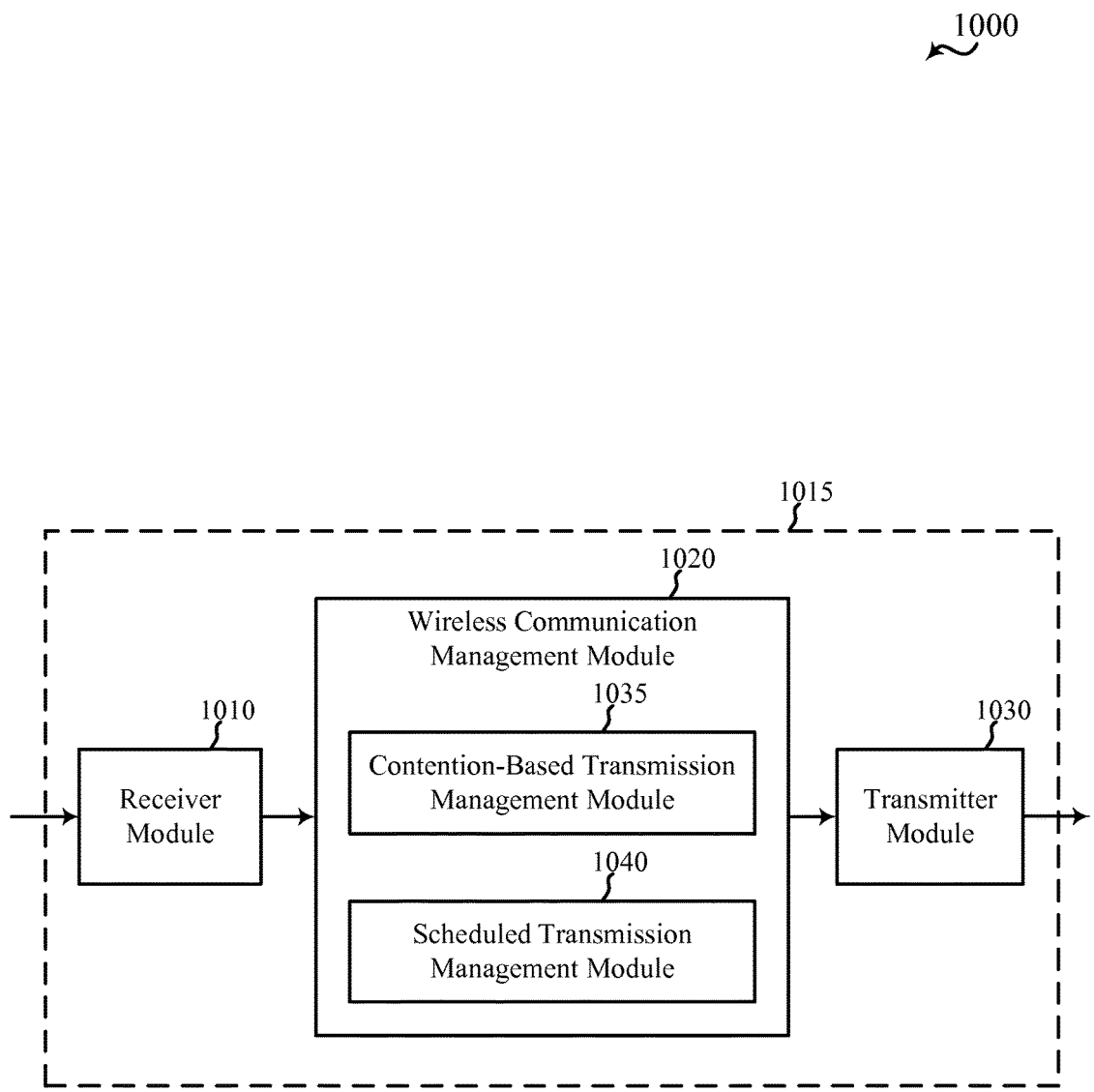
FIG. 10 shows a block diagram of a device for use in wireless communication, in accordance with various aspects of the present disclosure.

FIG. 10 shows a block diagram 1000 of a device 1015 for use in wireless communication, in accordance with various aspects of the present disclosure. The device 1015 may be an example of aspects of one or more of the UEs 115 described with reference to FIG. 1, 4, 5, 6, 7, 8, or 9. The device 1015 may also be or include a processor. The device 1015 may include a receiver module 1010, a wireless communication management module 1020, or a transmitter module 1030. Each of these modules may be in communication with each other.

The modules of the device 1015 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1010 may include at least one radio frequency (RF) receiver. The receiver module 1010 or RF receiver may be used to receive various types of data or control signals (i.e., transmissions) over one or more communication links of a wireless communication system, such as one or more communication links of the wireless communication system 100 described with reference to FIG. 1.

In some examples, the transmitter module 1030 may include at least one RF transmitter. The transmitter module 1030 or RF transmitter may be used to transmit various types of data or control signals (i.e., transmissions) over one or more communication links of a wireless communication system, such as one or more communication links of the wireless communication system 100 described with reference to FIG. 1.

In some configurations, the communication links over which the receiver module 1010 or transmitter module 1030 receive/transmit transmissions may carry one or more contention-based channels or scheduled channels, such as the contention-based channels or scheduled channels described with reference to FIG. 4, 5, 6, 7, 8, or 9.

The wireless communication management module 1020 may be used to manage one or more aspects of wireless communication for the device 1015. In some examples, the wireless communication management module 1020 may include a contention-based transmission management module 1035 or a scheduled transmission management module 1040.

The contention-based transmission management module 1035 may be used to transmit a first transmission, via the transmitter module 1030, on a contention-based channel. In some embodiments, the first transmission may include at least one of an OFDMA transmission, a CDMA transmission, or an SDMA transmission. In some configurations, the contention-based channel may at least partially overlap, in time or frequency, a channel available for scheduled transmissions. In other configurations, the contention-based channel may include a channel that does not overlap, in time or frequency, a channel available for scheduled transmissions.

The scheduled transmission management module 1040 may be used to transmit a scheduling request for the first transmission on a scheduled channel. The scheduling request may also be transmitted via the transmitter module 1030. The scheduled transmission management module 1040 may transmit the scheduling request prior to determining that an ACK message has been received for the first transmission. In some configurations, the scheduled channel may be a narrow-band channel.

In some embodiments of the wireless communication management module 1020, the contention-based transmission management module 1035 and scheduled transmission management module 1040 may transmit the first transmission and scheduling request simultaneously.

Figure 11:
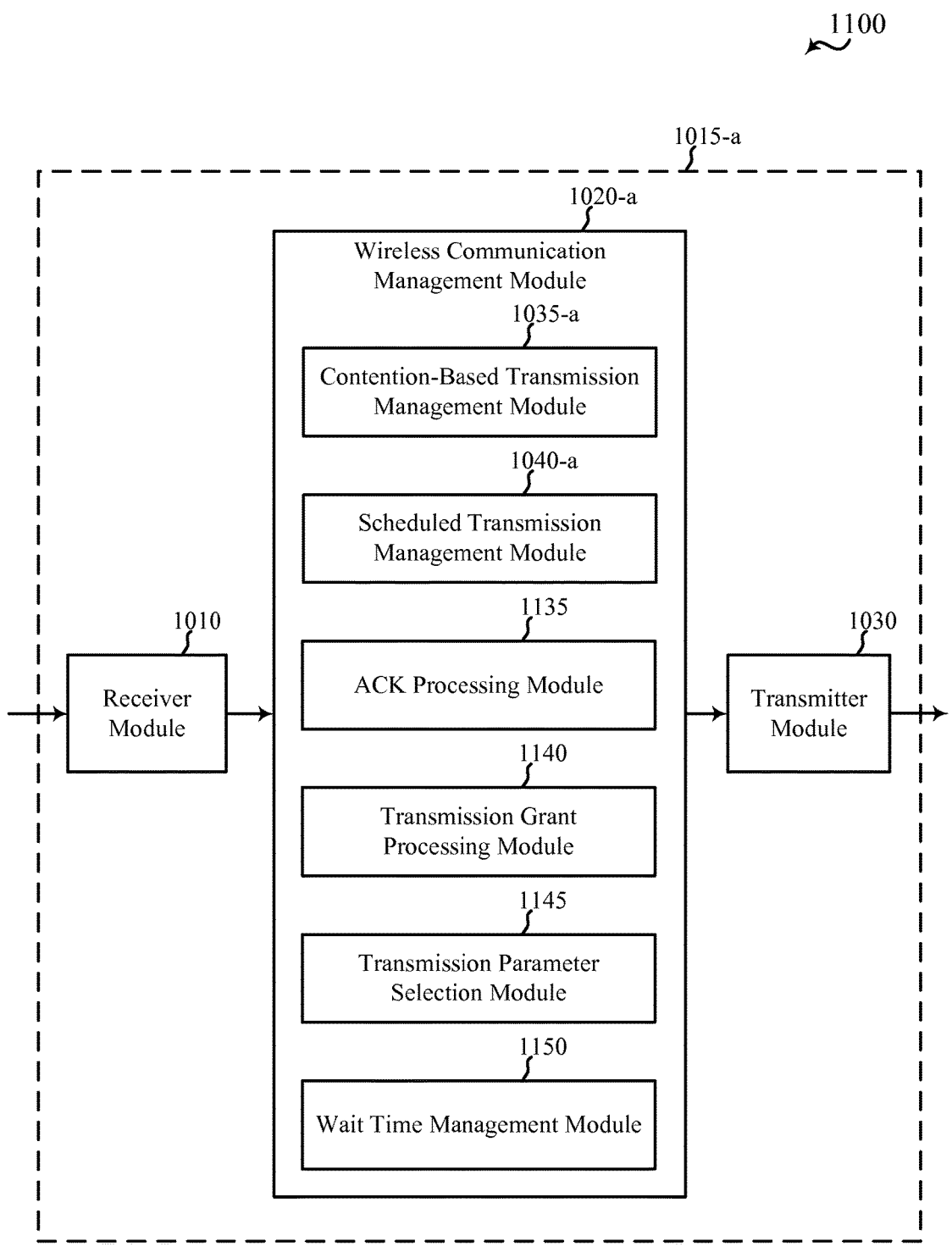
FIG. 11 shows a block diagram of a device for use in wireless communication, in accordance with various aspects of the present disclosure.

FIG. 11 shows a block diagram 1100 of a device 1015-a for use in wireless communication, in accordance with various aspects of the present disclosure. The device 1015-a may be an example of aspects of one or more of the UEs 115 described with reference to FIG. 1, 4, 5, 6, 7, 8, or 9, or aspects of the device 1015 described with reference to FIG. 10. The device 1015-a may also be or include a processor. The device 1015-a may include a receiver module 1010, a wireless communication management module 1020-a, or a transmitter module 1030. Each of these modules may be in communication with each other.

The modules of the device 1015-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some embodiments, the receiver module 1010 or transmitter module 1030 may be configured as described with reference to FIG. 10.

The wireless communication management module 1020-a may be used to manage one or more aspects of wireless communication for the device 1015-a. In some examples, the wireless communication management module 1020-a may include a contention-based transmission management module 1035-a, a scheduled transmission management module 1040-a, an ACK processing module 1135, a transmission grant processing module 1140, a transmission parameter selection module 1145, or a wait time management module 1150.

The contention-based transmission management module 1035-a may be used to transmit a first transmission, via the transmitter module 1030, on a contention-based channel. In some embodiments, the first transmission may include at least one of an OFDMA transmission, a CDMA transmission, or an SDMA transmission. In some configurations, the contention-based channel may at least partially overlap, in time or frequency, a channel available for scheduled transmissions. In other configurations, the contention-based channel may include a channel that does not overlap, in time or frequency, a channel available for scheduled transmissions. When the size of a transmission to be made exceeds a maximum size of the first transmission, a request for transmission of a second transmission (e.g., a scheduling request) may be transmitted as part of the first transmission (e.g., a scheduling request for the second transmission may be transmitted in a MAC header of the first transmission).

The scheduled transmission management module 1040 may be used to transmit a scheduling request for the first transmission on a scheduled channel. The scheduling request may also be transmitted via the transmitter module 1030. The scheduled transmission management module 1040 may transmit the scheduling request prior to determining that an ACK message has been received for the first transmission. In some configurations, the scheduled channel may be a narrow-band channel.

In some embodiments of the wireless communication management module 1020, the contention-based transmission management module 1035-a and scheduled transmission management module 1040-a may transmit the first transmission and scheduling request simultaneously.

The ACK processing module 1135 may be used to determine whether an ACK message is received for the first transmission. In some configurations, the determination made by the ACK processing module 1135 may be made at a scheduled time, upon expiration of a timer, or repeatedly (e.g., repeatedly within a defined time period or repeatedly for a defined number of times).

The transmission grant processing module 1140 may be used to determine whether a transmission grant (e.g., an uplink grant) is received in response to transmitting the scheduling request. In some configurations, the determination made by the transmission grant processing module 1140 may be made at a scheduled time, upon expiration of a timer, or repeatedly (e.g., repeatedly within a defined time period or repeatedly for a defined number of times). When the transmission grant processing module 1140 determines that a transmission grant is received in response to transmitting the scheduling request, the scheduled transmission management module 1040 may be used to retransmit the first transmission according to the transmission grant.

The transmission grant processing module 1140 may also be used to determine whether a transmission grant (e.g., an uplink grant) is received in response to transmitting a request for transmission of a second transmission (e.g., a scheduling request). In some cases, an ACK message and the transmission grant may be received as part of a single transmission. When the transmission grant processing module 1140 determines that a transmission grant is received in response to transmitting a request for transmission of a second transmission, the scheduled transmission management module 1040 may be used to transmit the second transmission according to the transmission grant.

When the ACK processing module 1135 determines that an ACK message for the first transmission has not been received, and when the transmission grant processing module 1140 determines that a transmission grant for the first transmission has not been received, e.g., after expiration of a wait time, the contention-based transmission management module 1035-a and scheduled transmission management module 1040-a may be used, respectively, to retransmit the first transmission and the scheduling request. In some instances, the scheduling request may be retransmitted on the scheduled channel contemporaneously with repeating transmission of the first transmission. In other instances, the scheduling request may be retransmitted in accordance with a scheduling request transmission periodicity.

The transmission parameter selection module 1145 may be used to select different transmission parameters for retransmitting the first transmission and the scheduling request. Alternatively, the first transmission and scheduling request may be retransmitted using the same transmission parameters used for a previous transmission of the first transmission and scheduling request.

The wait time management module 1150 may be used to manage the wait time on which retransmission of the first transmission and scheduling request are based. In some examples, the wait time may commence based at least in part on transmitting the first transmission or transmitting the scheduling request.

Figure 12:
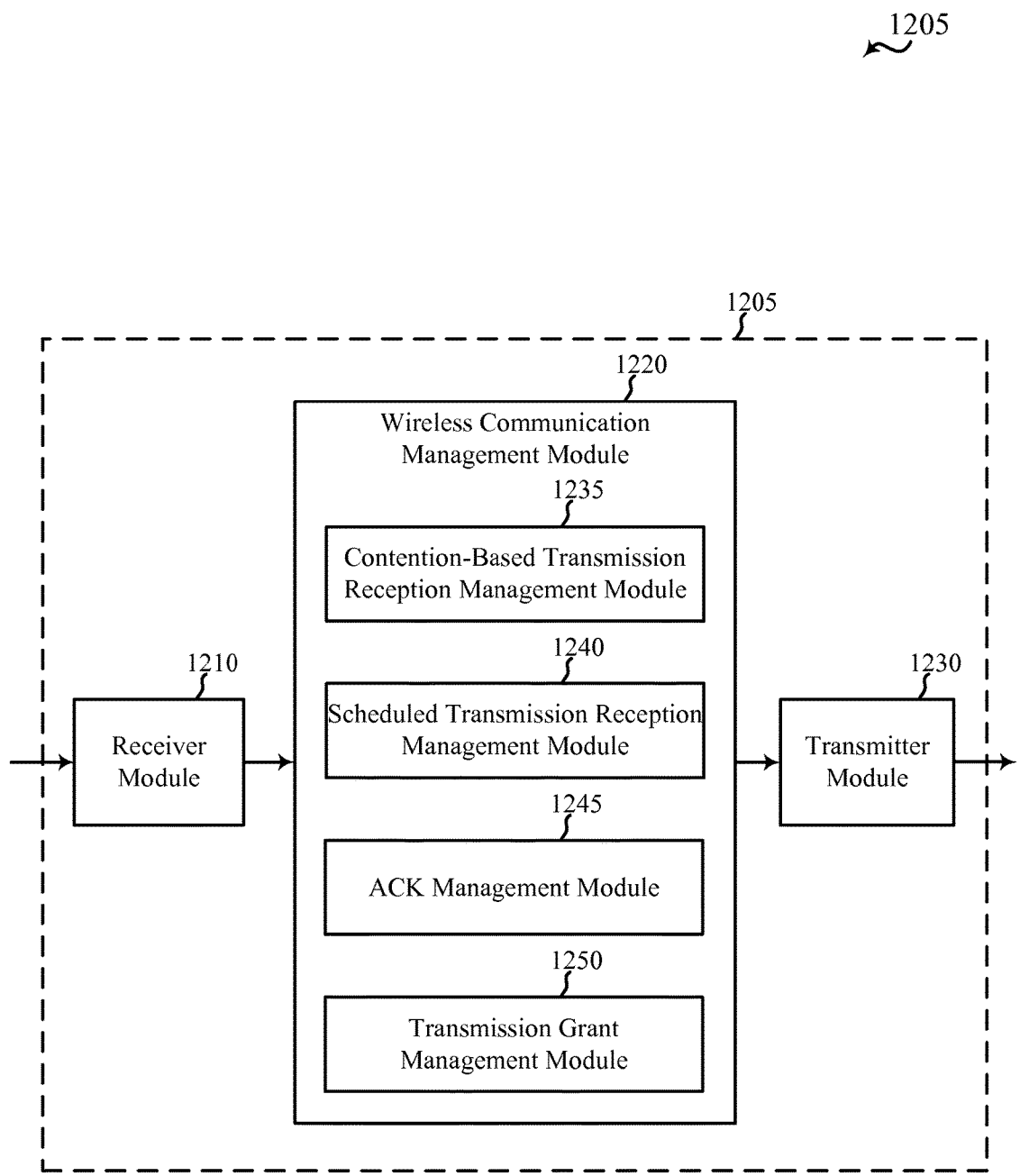
FIG. 12 shows a block diagram of a device for use in wireless communication, in accordance with various aspects of the present disclosure.

FIG. 12 shows a block diagram 1200 of a device 1205 for use in wireless communication, in accordance with various aspects of the present disclosure. The device 1205 may be an example of aspects of one or more of the base stations 105 described with reference to FIG. 1, 4, 5, 6, 7, 8, or 9. The device 1205 may also be or include a processor. The device 1205 may include a receiver module 1210, a wireless communication management module 1220, or a transmitter module 1230. Each of these modules may be in communication with each other.

The modules of the device 1205 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some examples, the receiver module 1210 may include at least one RF receiver. The receiver module 1210 or RF receiver may be used to receive various types of data or control signals (i.e., transmissions) over one or more communication links of a wireless communication system, such as one or more communication links of the wireless communication system 100 described with reference to FIG. 1.

In some examples, the transmitter module 1230 may include at least one RF transmitter. The transmitter module 1230 or RF transmitter may be used to transmit various types of data or control signals (i.e., transmissions) over one or more communication links of a wireless communication system, such as one or more communication links of the wireless communication system 100 described with reference to FIG. 1.

In some configurations, the communication links over which the receiver module 1210 or transmitter module 1230 receive/transmit transmissions may carry one or more contention-based channels or scheduled channels, such as the contention-based channels or scheduled channels described with reference to FIG. 4, 5, 6, 7, 8, or 9.

The wireless communication management module 1220 may be used to manage one or more aspects of wireless communication for the device 1205. In some examples, the wireless communication management module 1220 may include a contention-based transmission reception management module 1235, a scheduled transmission reception management module 1240, an ACK management module 1245, or a transmission grant management module 1250.

The contention-based transmission reception management module 1235 may be used to receive a first transmission, on a contention-based channel, from a wireless device (e.g., a UE). In some cases, the first transmission may include at least one of an OFDMA transmission, a CDMA transmission, or an SDMA transmission. In some cases, a request for transmission of a second transmission (e.g., a scheduling request) may be received as part of the first transmission (e.g., a scheduling request for the second transmission may be received in a MAC header of the first transmission). In some configurations, the contention-based channel may at least partially overlap, in time or frequency, a channel available for scheduled transmissions. In other configurations, the contention-based channel may include a channel that does not overlap, in time or frequency, a channel available for scheduled transmissions.

The scheduled transmission reception management module 1240 may be used to receive a scheduling request for the first transmission, on a scheduled channel, from the wireless device. In some configurations, the scheduled channel may be a narrow-band channel whose payload is substantially smaller than the payload of the first transmission, regardless of the physical bandwidth of the narrow-band channel.

The contention-based transmission reception management module 1235 and scheduled transmission reception management module 1240 may, under some scenarios, receive the first transmission and the scheduling request simultaneously. In other scenarios, the contention-based transmission reception management module 1235 may fail to receive, or receive and fail to decode, the first transmission, but the scheduled transmission reception management module 1240 may receive the scheduling request. In other scenarios, the contention-based transmission reception management module 1235 may receive the first transmission, but the scheduled transmission reception management module 1240 may fail to receive the scheduling request.

Upon receiving the first transmission, the ACK management module 1245 may be used to transmit, to the wireless device, an ACK message for the first transmission.

Upon failing to receive, or to receive and decode, the first transmission, and upon receiving the scheduling request, the transmission grant management module 1250 may be used to transmit, to the wireless device, a transmission grant for transmission of the first transmission on the scheduled channel. Upon receiving the first transmission and determining the first transmission includes a request for transmission of a second transmission, the transmission grant management module 1250 may transmit, to the wireless device, a transmission grant for transmission of the second transmission on the scheduled channel.

Figure 13:
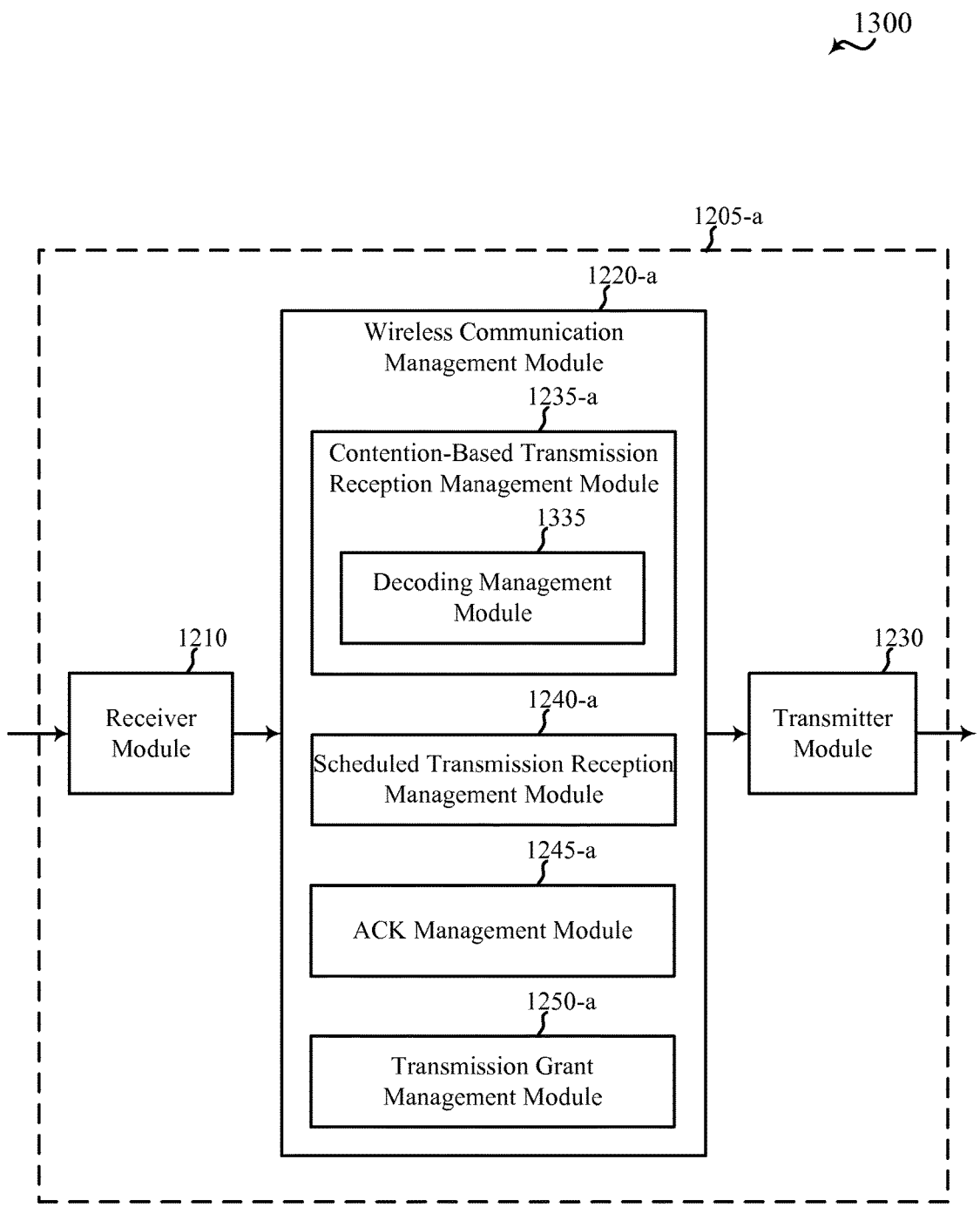
FIG. 13 shows a block diagram of a device for use in wireless communication, in accordance with various aspects of the present disclosure.

FIG. 13 shows a block diagram 1300 of a device 1205-a for use in wireless communication, in accordance with various aspects of the present disclosure. The device 1205-a may be an example of aspects of one or more of the base stations 105 described with reference to FIG. 1, 4, 5, 6, 7, 8, 9, or aspects of the device 1205 described with reference to FIG. 12. The device 1205-a may also be or include a processor. The device 1205-a may include a receiver module 1210, a wireless communication management module 1220-a, or a transmitter module 1230. Each of these modules may be in communication with each other.

The modules of the device 1205-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each module may also be implemented, in whole or in part, with instructions embodied in a memory, formatted to be executed by one or more general or application-specific processors.

In some embodiments, the receiver module 1210 or transmitter module 1230 may be configured as described with reference to FIG. 12.

The wireless communication management module 1220-a may be used to manage one or more aspects of wireless communication for the device 1205-a. In some examples, the wireless communication management module 1220-a may include a contention-based transmission reception management module 1235-a, a scheduled transmission reception management module 1240-a, an ACK management module 1245-a, or a transmission grant management module 1250-a.

The contention-based transmission reception management module 1235-a may be used to receive a first transmission, on a contention-based channel, from a wireless device (e.g., a UE). In some cases, the first transmission may include at least one of an OFDMA transmission, a CDMA transmission, or an SDMA transmission. In some cases, a request for transmission of a second transmission (e.g., a scheduling request) may be received as part of the first transmission (e.g., received in a MAC header of the first transmission). In some configurations, the contention-based channel may at least partially overlap, in time or frequency, a channel available for scheduled transmissions. In other configurations, the contention-based channel may include a channel that does not overlap, in time or frequency, a channel available for scheduled transmissions.

In some embodiments, the contention-based transmission reception management module 1235-a may include a decoding management module 1335. The decoding management module 1335 may be used to decode (or attempt to decode) the first transmission.

The scheduled transmission reception management module 1240-a may be used to receive a scheduling request for the first transmission, on a scheduled channel, from the wireless device. In some configurations, the scheduled channel may be a narrow-band channel.

The contention-based transmission reception management module 1235-a and scheduled transmission reception management module 1240-a may, under some scenarios, receive the first transmission and the scheduling request simultaneously. In other scenarios, the contention-based transmission reception management module 1235-a may fail to receive, or receive and fail to decode, the first transmission, but the scheduled transmission reception management module 1240-a may receive the scheduling request. In other scenarios, the contention-based transmission reception management module 1235-a may receive the first transmission, but the scheduled transmission reception management module 1240-a may fail to receive the scheduling request.

Upon decoding the first transmission, the ACK management module 1245-a may be used to transmit, to the wireless device, an ACK message for the first transmission.

Upon failing to receive the first transmission, and upon receiving the scheduling request, the transmission grant management module 1250-a may be used to transmit, to the wireless device, a transmission grant for transmission of the first transmission on the scheduled channel. Upon failing to decode the first transmission, and upon receiving the scheduling request, the transmission grant management module 1250-a may cause the decoding management module 1335 to make an additional attempt to decode the first transmission. When the additional attempt to decode the first transmission is successful, the transmission grant management module 1250-a may withhold transmission of (i.e., not transmit) a transmission grant for transmission of the first transmission on the scheduled channel, and cause the ACK management module 1245-a to transmit, to the wireless device, an ACK message for the first transmission. When the additional attempt to decode the first transmission is not successful, the transmission grant management module 1250-a may transmit, to the wireless device, a transmission grant for transmission of the first transmission on the scheduled channel. Upon decoding the first transmission and determining the first transmission includes a scheduling request for a second transmission, the transmission grant management module 1250-a may transmit, to the wireless device, a transmission grant for transmission of the second transmission on the scheduled channel.

Figure 14:
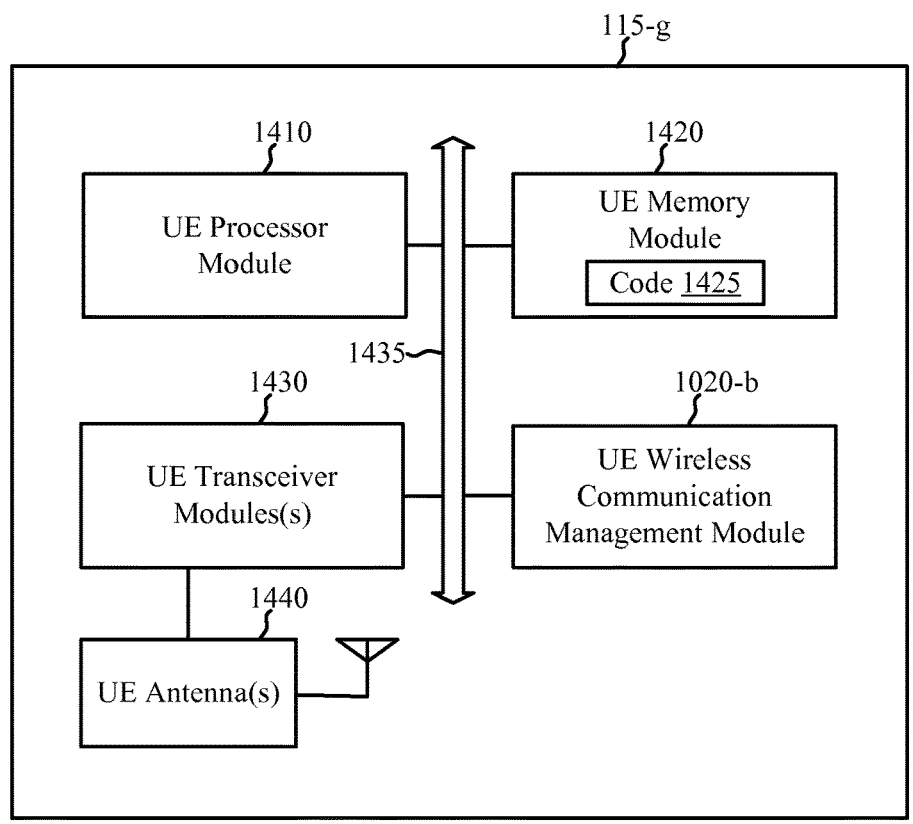
FIG. 14 shows a block diagram of a UE for use in wireless communication, in accordance with various aspects of the present disclosure.

FIG. 14 shows a block diagram 1400 of a UE 115-g for use in wireless communication, in accordance with various aspects of the present disclosure. The UE 115-*g* may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 115-*g* may, in some examples, have an internal power supply (not shown), such as a small battery, to facilitate mobile operation. In some examples, the UE 115-*g* may be an example of aspects of one or more of the UEs 115 described with reference to FIG. 1, 4, 5, 6, 7, 8, or 9, or aspects of one or more of the devices 1015 described with reference to FIG. 10 or 11. The UE 115-*g* may be configured to implement at least some of the UE or device features and functions described with reference to FIG. 1, 2, 3, 4, 5, 6, 7, 8, 9, 10, or 11.

The UE 115-*g* may include a UE processor module 1410, a UE memory module 1420, at least one UE transceiver module (represented by UE transceiver module(s) 1430), at least one UE antenna (represented by UE antenna(s) 1440), or a UE wireless communication management module 1020-*b*. Each of these components may be in communication with each other, directly or indirectly, over one or more buses 1435.

The UE memory module 1420 may include random access memory (RAM) or read-only memory (ROM). The UE memory module 1420 may store computer-readable, computer-executable code 1425 containing instructions that are configured to, when executed, cause the UE processor module 1410 to perform various functions described herein related to wireless communication, including, for example, transmissions on one or more contention-based channels and one or more scheduled channels. Alternatively, the code 1425 may not be directly executable by the UE processor module 1410 but be configured to cause the UE 115-*g* (e.g., when compiled and executed) to perform various of the functions described herein.

The UE processor module 1410 may include an intelligent hardware device, e.g., a central processing unit (CPU), a microcontroller, an ASIC, etc. The UE processor module 1410 may process information received through the UE transceiver module(s) 1430 or information to be sent to the UE transceiver module(s) 1430 for transmission through the UE antenna(s) 1440. The UE processor module 1410 may handle, alone or in connection with the UE wireless communication management module 1020-*b*, various aspects of communicating over (or managing communications over) a contention-based channel or a scheduled channel.

The UE transceiver module(s) 1430 may include a modem configured to modulate packets and provide the modulated packets to the UE antenna(s) 1440 for transmission, and to demodulate packets received from the UE antenna(s) 1440. The UE transceiver module(s) 1430 may, in some examples, be implemented as one or more UE transmitter modules and one or more separate UE receiver modules. The UE transceiver module(s) 1430 may support communications on one or more contention-based channels or one or more scheduled channels. The UE transceiver module(s) 1430 may be configured to communicate bi-directionally, via the UE antenna(s) 1440, with one or more of the base stations, such as one or more of the base stations 105 described with reference to FIG. 1, 4, 5, 6, 7, 8, or 9, or one or more devices, such as one or more of the devices 1015 described with reference to FIG. 10 or 11. While the UE 115-*g* may include a single UE antenna, there may be examples in which the UE 115-*g* may include multiple UE antennas 1440.

The UE wireless communication management module 1020-*b* may be configured to perform or control some or all of the UE 115 or device 1015 features or functions described with reference to FIG. 1, 2, 3, 4, 5, 6, 7, 8, 9, 10, or 11 related to wireless communication over one or more contention-based channels or one or more scheduled channels. The UE wireless communication management module 1020-*b*, or portions of it, may include a processor, or some or all of the functions of the UE wireless communication management module 1020-*b* may be performed by the UE processor module 1410 or in connection with the UE processor module 1410. In some examples, the UE wireless communication management module 1020-*b* may be an example of the wireless communication management module 1020 described with reference to FIG. 10 or 11.

Figure 15:
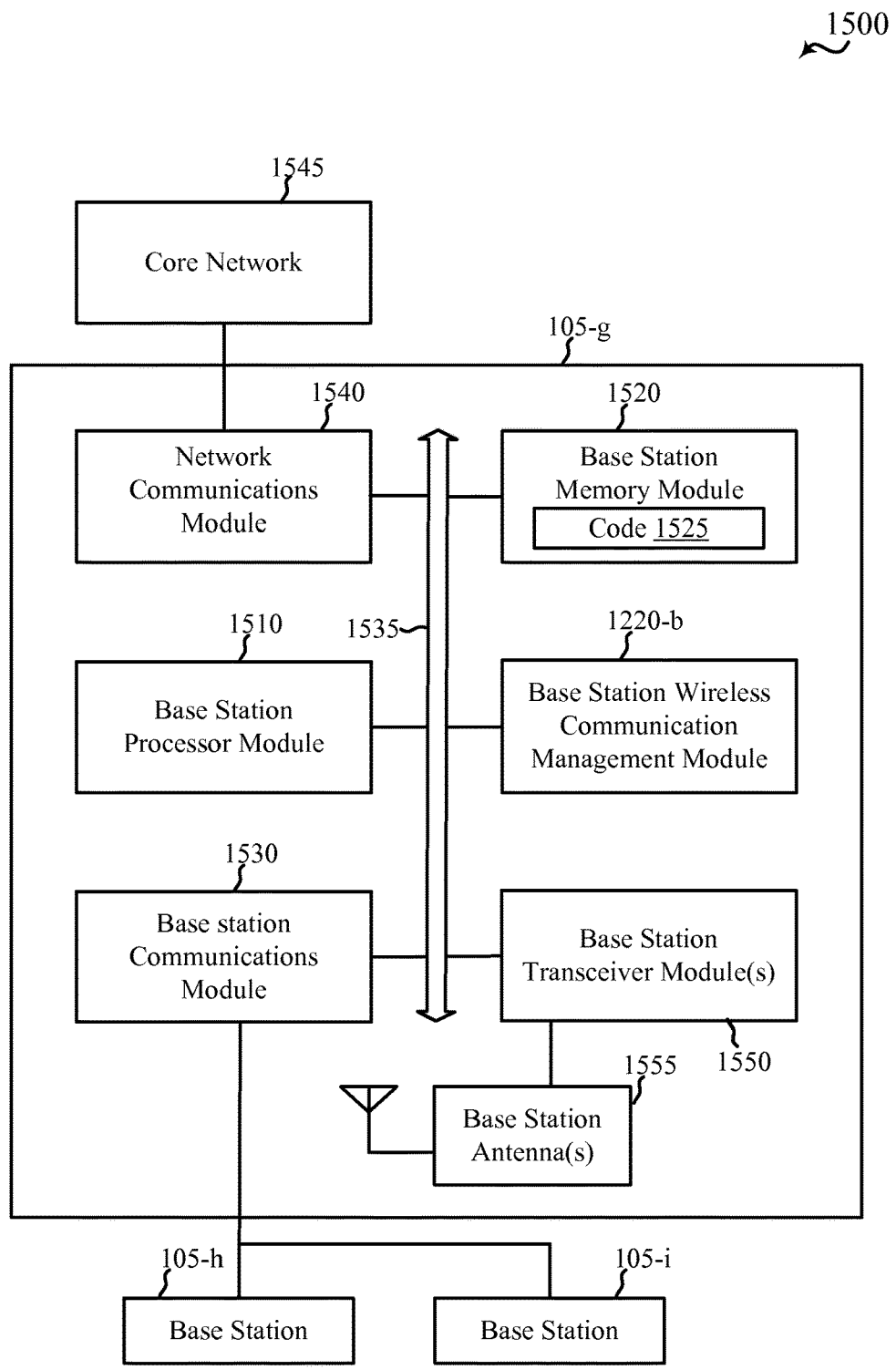
FIG. 15 shows a block diagram of a base station (e.g., a base station forming part or all of an eNB) for use in wireless communication, in accordance with various aspects of the present disclosure.

FIG. 15 shows a block diagram 1500 of a base station 105-*g* (e.g., a base station forming part or all of an eNB) for use in wireless communication, in accordance with various aspects of the present disclosure. In some examples, the base station 105-*g* may be an example of one or more aspects of the base station 105 described with reference to FIG. 1, 4, 5, 6, 7, 8, or 9, or aspects of the device 1205 described with reference to FIG. 12 or 13. The base station 105-*g* may be configured to implement or facilitate at least some of the base station features and functions described with reference to FIG. 1, 2, 3, 4, 5, 6, 7, 8, 9, 12, or 13.

The base station 105-*g* may include a base station processor module 1510, a base station memory module 1520, at least one base station transceiver module (represented by base station transceiver module(s) 1550), at least one base station antenna (represented by base station antenna(s) 1555), or a base station wireless communication management module 1220-*b*. The base station 105-*g* may also include one or more of a base station communications module 1530 or a network communications module 1540. Each of these components may be in communication with each other, directly or indirectly, over one or more buses 1535.

The base station memory module 1520 may include RAM or ROM. The base station memory module 1520 may store computer-readable, computer-executable code 1525 containing instructions that are configured to, when executed, cause the base station processor module 1510 to perform various functions described herein related to wireless communication, including, for example, receptions of transmissions on one or more contention-based channels and one or more scheduled channels. Alternatively, the code 1525 may not be directly executable by the base station processor module 1510 but be configured to cause the base station 105-*g* (e.g., when compiled and executed) to perform various of the functions described herein.

The base station processor module 1510 may include an intelligent hardware device, e.g., a CPU, a microcontroller, an ASIC, etc. The base station processor module 1510 may process information received through the base station transceiver module(s) 1550, the base station communications module 1530, or the network communications module 1540. The base station processor module 1510 may also process information to be sent to the transceiver module(s) 1550 for transmission through the base station antenna(s) 1555, to the base station communications module 1530, for transmission to one or more other base stations 105-*h* and 105-*i*, or to the network communications module 1540 for transmission to a core network 1545, which may be an example of one or more aspects of the core network 130 described with reference to FIG. 1. The base station processor module 1510 may handle, alone or in connection with the base station wireless communication management module 1220-*b*, various aspects of communicating over (or managing communications over) a contention-based channel or a scheduled channel.

The base station transceiver module(s) 1550 may include a modem configured to modulate packets and provide the modulated packets to the base station antenna(s) 1555 for transmission, and to demodulate packets received from the base station antenna(s) 1555. The base station transceiver module(s) 1550 may, in some examples, be implemented as one or more base station transmitter modules and one or more separate base station receiver modules. The base station transceiver module(s) 1550 may support communications on one or more contention-based channels or one or more scheduled channels. The base station transceiver module(s) 1550 may be configured to communicate bi-directionally, via the base station antenna(s) 1555, with one or more UEs or devices, such as one or more of the UEs 115 described with reference to FIG. 1, 4, 5, 6, 7, 8, 9, or 14, or one or more of the devices 1015 described with reference to FIG. 10 or 11. The base station 105-*g* may, for example, include multiple base station antennas 1555 (e.g., an antenna array). The base station 105-*g* may communicate with the core network 1545 through the network communications module 1540. The base station 105-*g* may also communicate with other base stations, such as the base stations 105-*h* and 105-*i*, using the base station communications module 1530.

The base station wireless communication management module 1220-*b* may be configured to perform or control some or all of the features or functions described with reference to FIG. 1, 2, 3, 4, 5, 6, 7, 8, 9, 12, or 13 related to wireless communication over one or more contention-based channels or one or more scheduled channels. The base station wireless communication management module 1220-*b*, or portions of it, may include a processor, or some or all of the functions of the base station wireless communication management module 1220-*b* may be performed by the base station processor module 1510 or in connection with the base station processor module 1510. In some examples, the base station wireless communication management module 1220-*b* may be an example of the wireless communication management module 1220 described with reference to FIG. 12 or 13.

Figure 16:
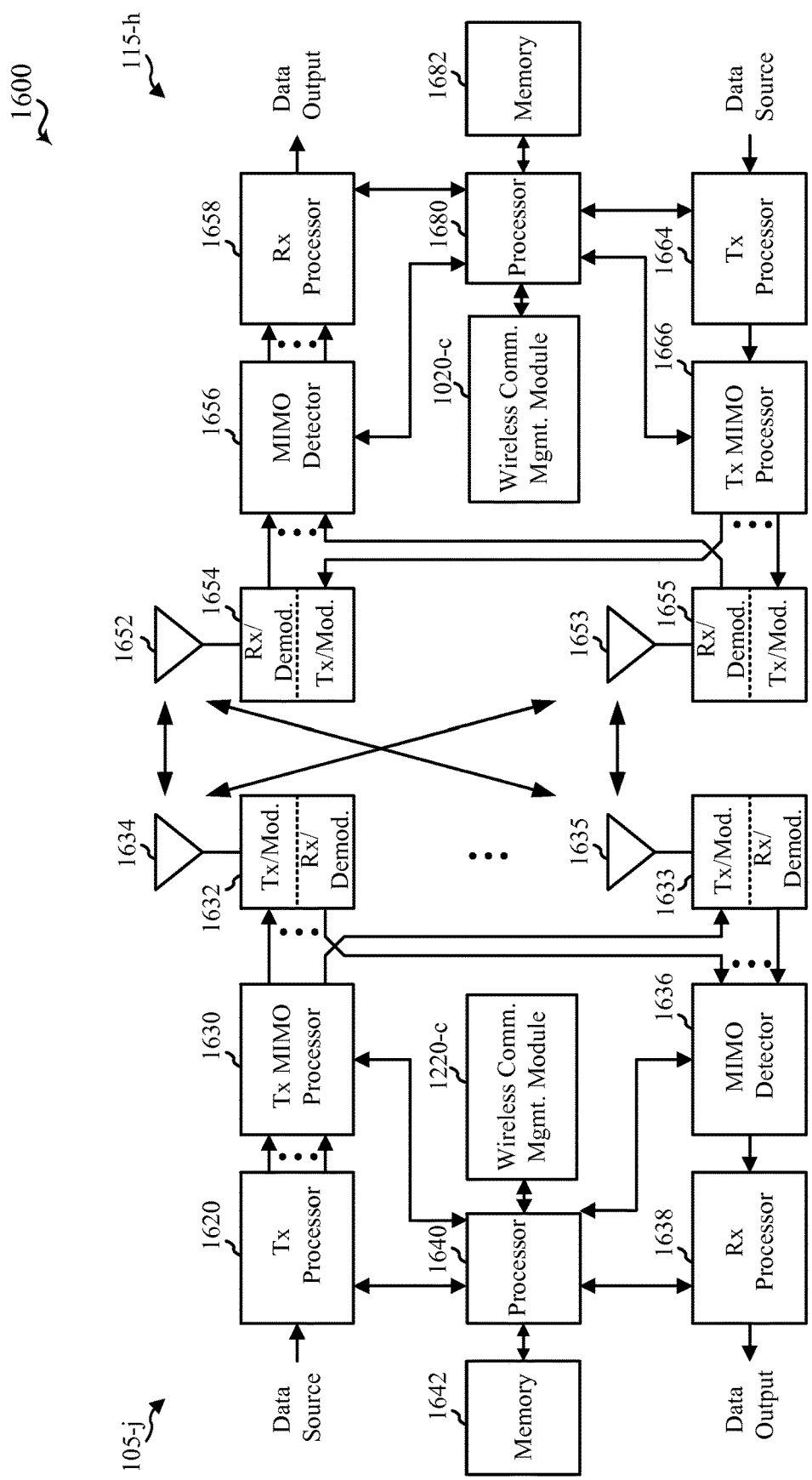
FIG. 16 is a block diagram of a MIMO communication system including a base station and a UE, in accordance with various aspects of the present disclosure.

FIG. 16 is a block diagram of a MIMO communication system 1600 including a base station 105-*j* and a UE 115-*h*, in accordance with various aspects of the present disclosure. The MIMO communication system 1600 may illustrate aspects of the wireless communication system 100 described with reference to FIG. 1. The base station 105-*j* may be an example of aspects of the base station 105 described with reference to FIG. 1, 4, 5, 6, 7, 8, 9, or 15, or aspects of the device 1205 described with reference to FIG. 12 or 13. The base station 105-*j* may be equipped with antennas 1634 through 1635, and the UE 115-*h* may be equipped with antennas 1652 through 1653. In the MIMO communication system 1600, the base station 105-*j* may be able to send data over multiple communication links at the same time. Each communication link may be called a "layer" and the "rank" of the communication link may indicate the number of layers used for communication. For example, in a 2×2 MIMO communication system where base station 105-*j* transmits two "layers," the rank of the communication link between the base station 105-*j* and the UE 115-*h* is two.

At the base station 105-*j*, a transmit (Tx) processor 1620 may receive data from a data source. The transmit processor 1620 may process the data. The transmit processor 1620 may also generate control symbols or reference symbols. A transmit MIMO processor 1630 may perform spatial processing (e.g., precoding) on data symbols, control symbols, or reference symbols, if applicable, and may provide output symbol streams to the transmit modulators 1632 through 1633. Each modulator 1632 through 1633 may process a respective output symbol stream (e.g., for OFDM, etc.) to obtain an output sample stream. Each modulator 1632 through 1633 may further process (e.g., convert to analog, amplify, filter, and upconvert) the output sample stream to obtain a downlink (DL) signal. In one example, DL signals from modulators 1632 through 1633 may be transmitted via the antennas 1634 through 1635, respectively.

The UE 115-*h* may be an example of aspects of the UEs 115 described with reference to FIG. 1, 4, 5, 6, 7, 8, 9, or 14, or aspects of the device 1015 described with reference to FIG. 10 or 11. At the UE 115-*h*, the UE antennas 1652 through 1653 may receive the DL signals from the base station 105-*j* and may provide the received signals to the modulator/demodulators 1654 through 1655, respectively. Each modulator/demodulator 1654 through 1655 may condition (e.g., filter, amplify, downconvert, and digitize) a respective received signal to obtain input samples. Each modulator/demodulator 1654 through 1655 may further process the input samples (e.g., for OFDM, etc.) to obtain received symbols. A MIMO detector 1656 may obtain received symbols from all the modulator/demodulators 1654 through 1655, perform MIMO detection on the received symbols, if applicable, and provide detected symbols. A receive (Rx) processor 1658 may process (e.g., demodulate, deinterleave, and decode) the detected symbols, providing decoded data for the UE 115-*h* to a data output, and provide decoded control information to a processor 1680, or memory 1682.

The processor 1680 may in some cases execute stored instructions to instantiate a UE wireless communication management module 1020-*c*. The UE wireless communication management module 1020-*c* may be an example of aspects of the wireless communication management module 1020 described with reference to FIG. 10, 11, or 14.

On the uplink (UL), at the UE 115-*h*, a transmit processor 1664 may receive and process data from a data source. The transmit processor 1664 may also generate reference symbols for a reference signal. The symbols from the transmit processor 1664 may be precoded by a transmit MIMO processor 1666 if applicable, further processed by the modulator/demodulators 1654 through 1655 (e.g., for SC-FDMA, etc.), and be transmitted to the base station 105-*j* in accordance with the transmission parameters received from the base station 105-*j*. At the base station 105-*j*, the UL signals from the UE 115-*h* may be received by the antennas 1634 through 1635, processed by the demodulators 1632 through 1633, detected by a MIMO detector 1636 if applicable, and further processed by a receive processor 1638. The receive processor 1638 may provide decoded data to a data output and to the processor 1640 or memory 1642.

The processor 1640 may in some cases execute stored instructions to instantiate a base station wireless communication management module 1220-*c*. The base station wireless communication management module 1220-*c* may be an example of aspects of the wireless communication management module 1220 described with reference to FIG. 12, 13, or 15.

The components of the UE 115-*h* may, individually or collectively, be implemented with one or more ASICs adapted to perform some or all of the applicable functions in hardware. Each of the noted modules may be a means for performing one or more functions related to operation of the MIMO communication system 1600. Similarly, the components of the base station **105-*j* may, individually or collectively, be implemented with one or more ASICs adapted to perform some or all of the applicable functions in hardware. Each of the noted components may be a means for performing one or more functions related to operation of the MIMO communication system 1600**.

Figure 17:
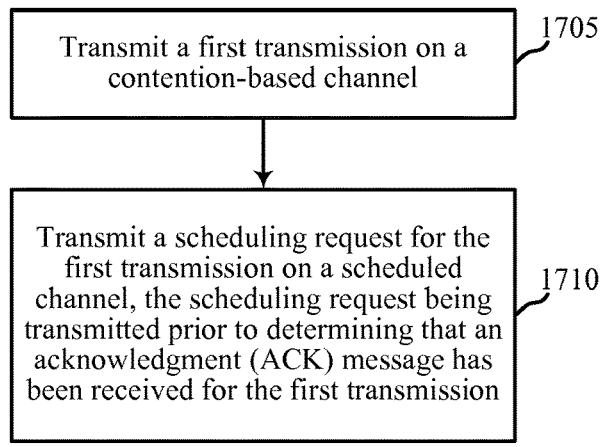
FIG. 17 is a flow chart illustrating an exemplary method for wireless communication, in accordance with various aspects of the present disclosure.

FIG. 17 is a flow chart illustrating an exemplary method 1700 for wireless communication, in accordance with various aspects of the present disclosure. For clarity, the method 1700 is described below with reference to aspects of one or more of the UEs 115 described with reference to FIG. 1, 4, 5, 6, 7, 8, 9, 14, or 16, or aspects of one or more of the devices 1015 described with reference to FIG. 10 or 11. In some examples, a UE or device may execute one or more sets of codes to control the functional elements of the UE or device to perform the functions described below. Additionally or alternatively, the UE or device may perform one or more of the functions described below using special-purpose hardware.

At block 1705, a first transmission may be transmitted on a contention-based channel. In some configurations, the contention-based channel may at least partially overlap, in time or frequency, a channel available for scheduled transmissions. In other configurations, the contention-based channel may include a channel that does not overlap, in time or frequency, a channel available for scheduled transmissions. The operation(s) at block 1705 may be performed using the wireless communication management module 1020 described with reference to FIG. 10, 11, 14, or 16, or the contention-based transmission management module 1035 described with reference to FIG. 10 or 11.

At block 1710, a scheduling request for the first transmission may be transmitted on a scheduled channel. The scheduling request may be transmitted prior to determining that an ACK message has been received for the first transmission. In some configurations, the scheduled channel may be a contention-free narrow-band channel whose payload is substantially smaller than the payload of the first transmission, regardless of the physical bandwidth of the narrow-band channel. The operation(s) at block 1710 may be performed using the wireless communication management module 1020 described with reference to FIG. 10, 11, 14, or 16, or the scheduled transmission management module 1040 described with reference to FIG. 10 or 11.

In some embodiments of the method 1700, the first transmission and the scheduling request may be transmitted simultaneously. In some embodiments, the first transmission may include at least one of an OFDMA transmission, a CDMA transmission, or an SDMA transmission.

Thus, the method 1700 may provide for wireless communication. It should be noted that the method 1700 is just one implementation and that the operations of the method 1700 may be rearranged or otherwise modified such that other implementations are possible.

Figure 18:
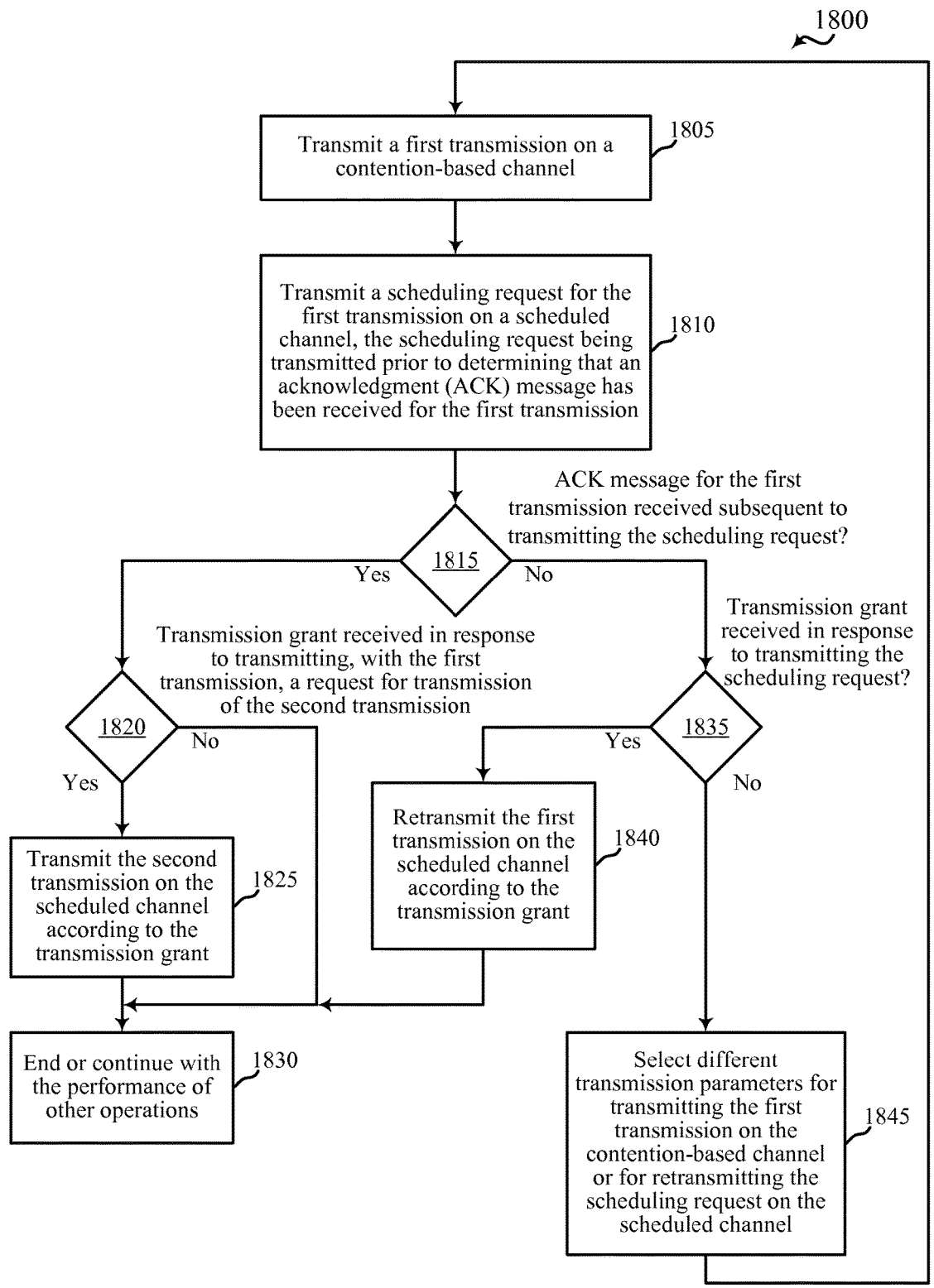
FIG. 18 is a flow chart illustrating an exemplary method for wireless communication, in accordance with various aspects of the present disclosure.

FIG. 18 is a flow chart illustrating an exemplary method 1800 for wireless communication, in accordance with various aspects of the present disclosure. For clarity, the method 1800 is described below with reference to aspects of one or more of the UEs 115 described with reference to FIG. 1, 4, 5, 6, 7, 8, 9, 14, or 16, or aspects of one or more of the devices 1015 described with reference to FIG. 10 or 11. In some examples, a UE or device may execute one or more sets of codes to control the functional elements of the UE or device to perform the functions described below. Additionally or alternatively, the UE or device may perform one or more of the functions described below using special-purpose hardware.

At block 1805, a first transmission may be transmitted on a contention-based channel. In some configurations, the contention-based channel may at least partially overlap, in time or frequency, a channel available for scheduled transmissions. In other configurations, the contention-based channel may include a channel that does not overlap, in time or frequency, a channel available for scheduled transmissions. When the size of a transmission to be made exceeds a maximum size of the first transmission, a request for transmission of a second transmission (e.g., a scheduling request) may be transmitted as part of the first transmission (e.g., a scheduling request for the second transmission may be transmitted in a MAC header of the first transmission). The operation(s) at block 1805 may be performed using the wireless communication management module 1020 described with reference to FIG. 10, 11, 14, or 16, or the contention-based transmission management module 1035 described with reference to FIG. 10 or 11.

At block 1810, a scheduling request for the first transmission may be transmitted on a scheduled channel. The scheduling request may be transmitted prior to determining that an ACK message has been received for the first transmission. In some configurations, the scheduled channel may be a narrow-band channel. The operation(s) at block 1810 may be performed using the wireless communication management module 1020 described with reference to FIG. 10, 11, 14, or 16, or the scheduled transmission management module 1040 described with reference to FIG. 10 or 11.

In some embodiments of the method 1800, the first transmission and the scheduling request may be transmitted simultaneously. In some embodiments, the first transmission may include at least one of an OFDMA transmission, a CDMA transmission, or an SDMA transmission.

At block 1815, it may be determined whether an ACK message for the first transmission is received subsequent to transmitting the scheduling request at block 1810. In some configurations, the determination made at block 1825 may be made at a scheduled time, upon expiration of a timer, or repeatedly (e.g., repeatedly within a defined time period or repeatedly for a defined number of times). When it is determined that the ACK message is received, the method 1800 may continue at block 1820. When it is determined that the ACK message is not received, the method 1800 may continue at block 1835. The operation(s) at block 1815 may be performed using the wireless communication management module 1020 described with reference to FIG. 10, 11, 14, or 16, or the ACK processing module 1135 described with reference to FIG. 11.

At block 1820, it may be determined whether a transmission grant (e.g., an uplink grant) is received in response to transmitting a request for transmission of a second transmission at block 1805. In some cases, the ACK message and the transmission grant may be received as part of a single transmission. When it is determined that the transmission grant is received, the method 1800 may continue at block 1825. When it is determined that the transmission grant is not received, the method 1800 may continue at block 1830. The operation(s) at block 1820 may be performed using the wireless communication management module 1020 described with reference to FIG. 10, 11, 14, or 16, or the transmission grant processing module 1140 described with reference to FIG. 11.

At block 1825, a second transmission may be transmitted on the scheduled channel according to the transmission grant. The method 1800 may then end or continue with the performance of other operations at block 1830. The operation(s) at block 1825 may be performed using the wireless communication management module 1020 described with reference to FIG. 10, 11, 14, or 16, or the scheduled transmission management module 1040 described with reference to FIG. 10 or 11.

At block 1830, the method 1800 may end or continue with the performance of other operations. The operation(s) at block 1830 may be performed using the wireless communication management module 1020 described with reference to FIG. 10, 11, 14, or 16.

Additional details of the operations performed at blocks 1805, 1810, 1815, 1820, 1825, and/or 1830 are described with reference to FIG. 10. Additional details of the operations performed at blocks 1805, 1810, 1815, 1820, and/or 1830 are described with reference to FIG. 4 or 8.

At block 1835, it may be determined whether a transmission grant (e.g., an uplink grant) is received in response to transmitting the scheduling request. In some configurations, the determination made at block 1835 may be made at a scheduled time, upon expiration of a timer, or repeatedly (e.g., repeatedly within a defined time period or repeatedly for a defined number of times). When it is determined that the transmission grant is received, the method 1800 may continue at block 1840. When it is determined that the transmission grant is not received, the method 1800 may be repeated (e.g., the flow of the method 1800 may be redirected to block 1805, or the flow of the method 1800 may be directed to block 1845). When repeating the method 1800 in some instances, the scheduling request may be retransmitted on the scheduled channel contemporaneously with repeating transmission of the first transmission. When repeating the method 1800 in other instances, the scheduling request may be retransmitted in accordance with a scheduling request transmission periodicity. The operation(s) at block 1835 may be performed using the wireless communication management module 1020 described with reference to FIG. 10, 11, 14, or 16, or the transmission grant processing module 1140 described with reference to FIG. 11.

At block 1840, the first transmission may be retransmitted on the scheduled channel according to the transmission grant. The method 1800 may then end or continue with the performance of other operations at block 1830. The operation(s) at block 1840 may be performed using the wireless communication management module 1020 described with reference to FIG. 10, 11, 14, or 16, or the scheduled transmission management module 1040 described with reference to FIG. 10 or 11.

Additional details of the operations performed at blocks 1805, 1810, 1815, 1835, 1840, and/or 1830 are described with reference to FIG. 5 or 9.

At block 1845, different transmission parameters may be selected for transmitting the first transmission on the contention-based channel or for retransmitting the scheduling request on the scheduled channel, such that the first transmission or scheduling request is retransmitted using different transmission parameters during a repetition of the method 1800. Alternatively, the first transmission or scheduling request may be transmitted using the same transmission parameters used for a previous transmission of the first transmission or scheduling request. The operation(s) at block 1845 may be performed using the wireless communication management module 1020 described with reference to FIG. 10, 11, 14, or 16, or the transmission parameter selection module 1145 described with reference to FIG. 11.

In some configurations, the flow of the method 1800 may be redirected to block 1805 or directed to block 1845, from block 1835, following expiration of a wait time (e.g., expiration of wait time prior to receiving at least one of an ACK message or a transmission grant). In some examples, the wait time may commence based at least in part on one of transmitting the first transmission at block 1805, or of transmitting the scheduling request at block 1810. The wait time may be managed using the wireless communication management module 1020 described with reference to FIG. 10, 11, 14, or 16, or the wait time management module 1150 described with reference to FIG. 11.

Additional details of the operations performed at blocks 1805, 1810, 1815, 1835, 1845, and/or 1830 are described with reference to FIG. 6.

Thus, the method 1800 may provide for wireless communication. It should be noted that the method 1800 is just one implementation and that the operations of the method 1800 may be rearranged or otherwise modified such that other implementations are possible.

In some embodiments, aspects of the methods 1700 and 1800 described with reference to FIGS. 17 and 18 may be combined.

Figure 19:
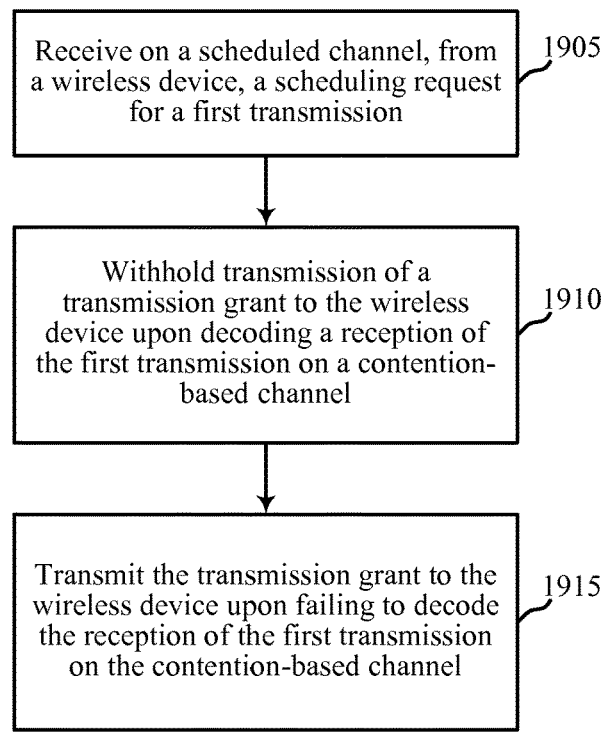
FIG. 19 is a flow chart illustrating an exemplary method for wireless communication, in accordance with various aspects of the present disclosure.

FIG. 19 is a flow chart illustrating an exemplary method 1900 for wireless communication, in accordance with various aspects of the present disclosure. For clarity, the method 1900 is described below with reference to aspects of one or more of the base stations 105 described with reference to FIG. 1, 4, 5, 6, 7, 8, 9, 15, or 16, or aspects of one or more of the devices 1205 described with reference to FIG. 12 or 13. In some examples, a base station or device may execute one or more sets of codes to control the functional elements of the base station or device to perform the functions described below. Additionally or alternatively, the base station or device may perform one or more of the functions described below using special-purpose hardware.

At block 1905, a scheduling request for a first transmission may be received on a scheduled channel from a wireless device (e.g., a UE). In some configurations, the scheduled channel may be a narrow-band channel. The operation(s) at block 1905 may be performed using the wireless communication management module 1220 described with reference to FIG. 12, 13, 15, or 16, or the scheduled transmission reception management module 1240 described with reference to FIG. 12 or 13.

At block 1910, a transmission of a transmission grant to the wireless device may be withheld upon decoding a reception of the first transmission on a contention-based channel. At block 1915, the transmission grant may be transmitted to the wireless device upon failing to decode the reception of the first transmission on the contention-based channel. In some configurations, the contention-based channel may at least partially overlap, in time or frequency, a channel available for scheduled transmissions. In other configurations, the contention-based channel may include a channel that does not overlap, in time or frequency, a channel available for scheduled transmissions. The operation(s) at block 1910 or 1915 may be performed using the wireless communication management module 1220 described with reference to FIG. 12, 13, 15, or 16, or the transmission grant management module 1250 described with reference to FIG. 12 or 13.

In some embodiments of the method 1900, the first transmission and the scheduling request may be received simultaneously. In some embodiments, the first transmission may include at least one of an OFDMA transmission, a CDMA transmission, or an SDMA transmission.

Thus, the method 1900 may provide for wireless communication. It should be noted that the method 1900 is just one implementation and that the operations of the method 1900 may be rearranged or otherwise modified such that other implementations are possible.

Figure 20:
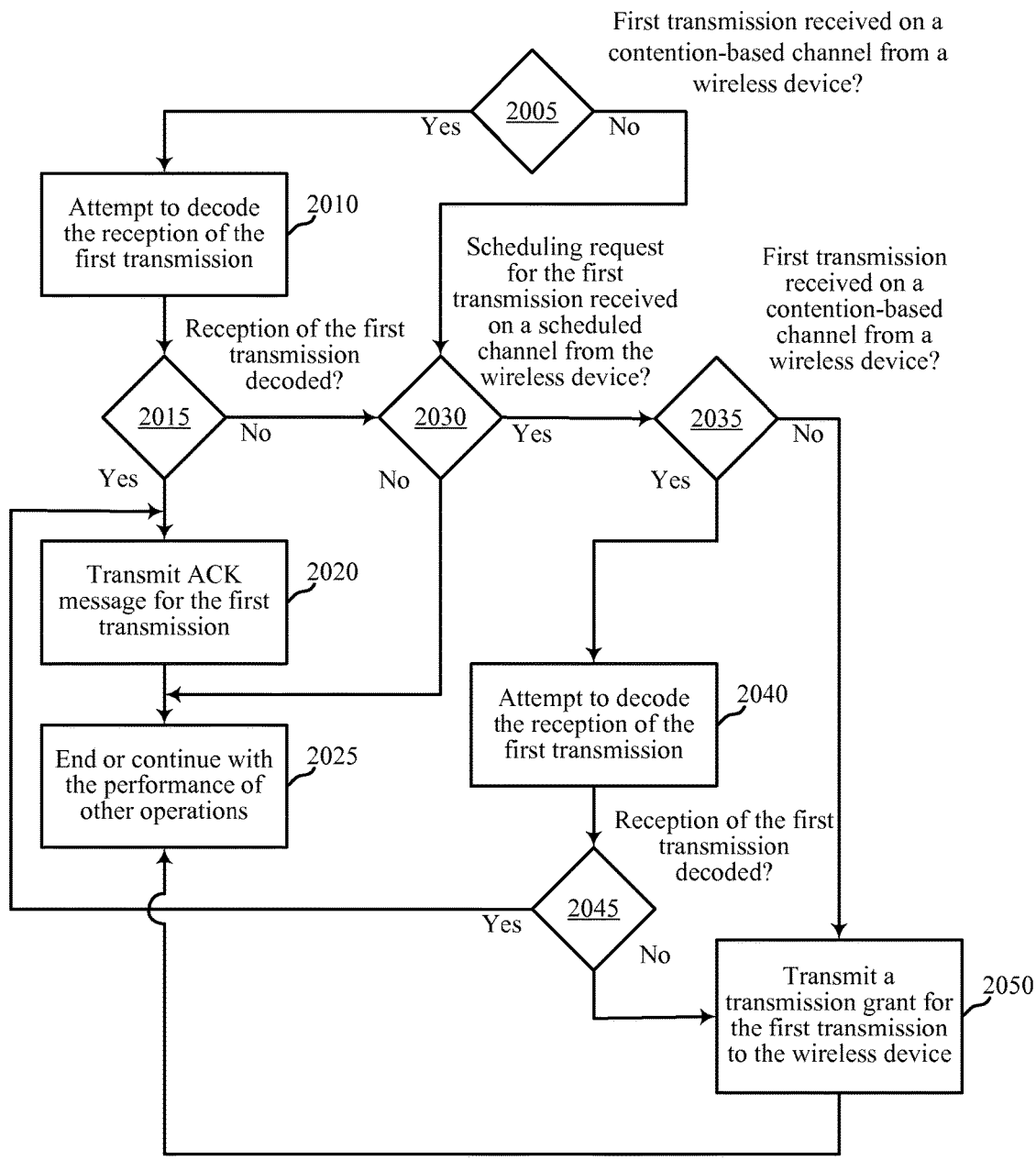
FIG. 20 is a flow chart illustrating an exemplary method for wireless communication, in accordance with various aspects of the present disclosure.

FIG. 20 is a flow chart illustrating an exemplary method 2000 for wireless communication, in accordance with various aspects of the present disclosure. For clarity, the method 2000 is described below with reference to aspects of one or more of the base stations 105 described with reference to FIG. 1, 4, 5, 6, 7, 8, 9, 15, or 16, or aspects of one or more of the devices 1205 described with reference to FIG. 12 or 13. In some examples, a base station or device may execute one or more sets of codes to control the functional elements of the base station or device to perform the functions described below. Additionally or alternatively, the base station or device may perform one or more of the functions described below using special-purpose hardware.

At block 2005, it may be determined whether a first transmission is received on a contention-based channel from a wireless device (e.g., a UE). When it is determined that the first transmission is received, the method 2000 may continue at block 2010. When it is determined that the first transmission is not received, the method 2000 may continue at block 2030. In some configurations, the contention-based channel may at least partially overlap, in time or frequency, a channel available for scheduled transmissions. In other configurations, the contention-based channel may include a channel that does not overlap, in time or frequency, a channel available for scheduled transmissions. The operation(s) at block 2005 may be performed using the wireless communication management module 1220 described with reference to FIG. 12, 13, 15, or 16, or the contention-based transmission reception management module 1235 described with reference to FIG. 12 or 13.

At block 2010, an attempt to decode the reception of the first transmission (e.g., a first attempt to decode the first transmission) may be made. At block 2015, it may be determined whether the reception of the first transmission was decoded at block 2010. When the reception of the first transmission is decoded, the method 2000 may continue at block 2020. When the reception of the first transmission is not decoded (i.e., after failing the first attempt to decode the first transmission), the method 2000 may continue at block 2030. The operation(s) at block 2010 or 2015 may be performed using the wireless communication management module 1220 described with reference to FIG. 12, 13, 15, or 16, or the decoding management module 1335 described with reference to FIG. 13.

At block 2020, an ACK message for the first transmission may be transmitted upon decoding the reception of the first transmission. The operation(s) at block 2020 may be performed using the wireless communication management module 1220 described with reference to FIG. 12, 13, 15, or 16, or the ACK management module 1245 described with reference to FIG. 12 or 13.

At block 2025, the method 2000 may end or continue with the performance of other operations. The operation(s) at block 2025 may be performed using the wireless communication management module 1220 described with reference to FIG. 12, 13, 15, or 16.

At block 2030, it may be determined whether a scheduling request for the first transmission is received on a scheduled channel from the wireless device. When it is determined that the scheduling request is received (e.g., after the scheduling request is decoded), the method 2000 may include withholding transmission of a transmission grant to the wireless device and continuing at block 2035. When it is determined that the scheduling request is not received, the method 2000 may continue at block 2025. In some configurations, the scheduled channel may be a narrow-band channel. The operation(s) at block 2230 may be performed using the wireless communication management module 1220 described with reference to FIG. 12, 13, 15, or 16, or the scheduled transmission reception management module 1240 described with reference to FIG. 12 or 13.

At block 2035, the flow of the method 2000 may be directed based on reception of the first transmission at block 2005. When it is determined at block 2005 that the first transmission is received, block 2035 may direct the flow of the method 2000 to block 2040. When it is determined at block 2005 that the first transmission is not received, block 2035 may direct the flow of the method 2000 to block 2050. The operation(s) at block 2035 may be performed using the wireless communication management module 1220 described with reference to FIG. 12, 13, 15, or 16.

At block 2040, and after decoding the scheduling request at block 2030, an attempt to decode the reception of the first transmission (e.g., a second attempt to decode the first transmission (e.g., the contention based transmission) may be made. At block 2045, it may be determined whether the reception of the first transmission was decoded at block 2040. When the reception of the first transmission is decoded, transmission of a transmission grant to the wireless device may be withheld, and the method 2000 may continue at block 2020. When the reception of the first transmission is not decoded (i.e., after failing the second attempt to decode the first transmission), the method 2000 may continue at block 2050. The operation(s) at block 2040 may be performed using the wireless communication management module 1220 described with reference to FIG. 12, 13, 15, or 16, or the decoding management module 1335 described with reference to FIG. 13.

At block 2050, a transmission grant for the first transmission may be transmitted to the wireless device upon failing to decode the reception of the first transmission on the contention-based channel. The operation(s) at block 2050 may be performed using the wireless communication management module 1220 described with reference to FIG. 12, 13, 15, or 16, or the transmission grant management module 1250 described with reference to FIG. 12 or 13.

In some embodiments of the method 2000, the first transmission and the scheduling request may be received simultaneously. In some embodiments, the first transmission may include at least one of an OFDMA transmission, a CDMA transmission, or an SDMA transmission.

Thus, the method 2000 may provide for wireless communication. It should be noted that the method 2000 is just one implementation and that the operations of the method 2000 may be rearranged or otherwise modified such that other implementations are possible.

Figure 21:
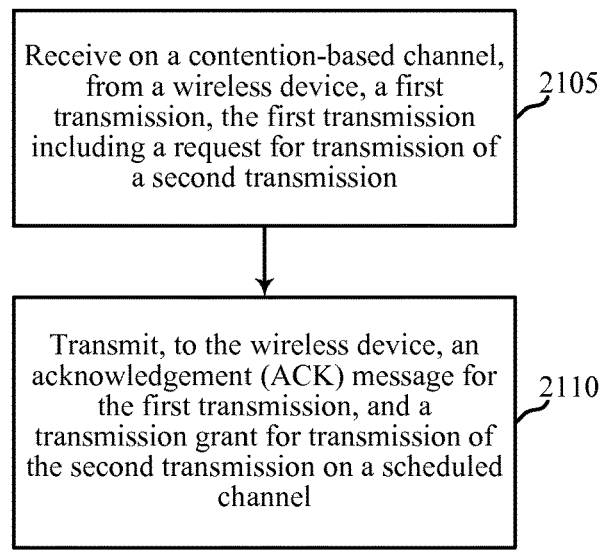
FIG. 21 is a flow chart illustrating an exemplary method for wireless communication, in accordance with various aspects of the present disclosure.

FIG. 21 is a flow chart illustrating an exemplary method 2100 for wireless communication, in accordance with various aspects of the present disclosure. For clarity, the method 2100 is described below with reference to aspects of one or more of the base stations 105 described with reference to FIG. 1, 4, 5, 6, 7, 8, 9, 15, or 16, or aspects of one or more of the devices 1205 described with reference to FIG. 12 or 13. In some examples, a base station or device may execute one or more sets of codes to control the functional elements of the base station or device to perform the functions described below. Additionally or alternatively, the base station or device may perform one or more of the functions described below using special-purpose hardware.

At block 2105, a first transmission may be received on a contention-based channel from a wireless device (e.g., a UE). The first transmission may include a request for transmission of a second transmission. In some configurations, the contention-based channel may at least partially overlap, in time or frequency, a channel available for scheduled transmissions. In other configurations, the contention-based channel may include a channel that does not overlap, in time or frequency, a channel available for scheduled transmissions. The operation(s) at block 2105 may be performed using the wireless communication management module 1220 described with reference to FIG. 12, 13, 15, or 16, or the contention-based transmission reception management module 1235 described with reference to FIG. 12 or 13.

At block 2110, an ACK message for the first transmission, and a transmission grant for transmission of the second transmission on a scheduled channel, may be transmitted to the wireless device. In some configurations, the scheduled channel may be a narrow-band channel. The operation(s) at block 2110 may be performed using the wireless communication management module 1220 described with reference to FIG. 12, 13, 15, or 16, or the ACK management module 1245 or transmission grant management module 1250 described with reference to FIG. 12 or 13.

In some embodiments of the method 2200, the first transmission and the scheduling request may be received simultaneously. In some embodiments, the first transmission may include at least one of an OFDMA transmission, a CDMA transmission, or an SDMA transmission.

Thus, the method 2100 may provide for wireless communication. It should be noted that the method 2100 is just one implementation and that the operations of the method 2100 may be rearranged or otherwise modified such that other implementations are possible.

In some embodiments, aspects of two or more of the methods 1900, 2000, or 2100 described with reference to FIG. 19, 20, or 21 may be combined.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can include RAM, ROM, electrically erasable programmable ROM (EEPROM), flash memory, compact disk ROM (CD-ROM) or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   transmitting a first data message on a contention-based channel;
   transmitting a scheduling request for the first data message on a scheduled channel, the scheduling request being transmitted prior to determining whether an acknowledgment (ACK) message has been received for the first data message;
   determining whether the ACK message has been received for the first data message;
   determining whether a transmission grant has been received based at least in part on transmitting the scheduling request for the first data message;
   selecting whether to repeat transmission of the scheduling request using different parameters on the scheduled channel or to repeat transmission of the first data message on the contention-based channel based at least in part on an expiration of a wait time, wherein the wait time commences based at least in part on one of transmitting the first data message or transmitting the scheduling request, the selecting based at least in part on whether the ACK message and the transmission grant have been received before the expiration of the wait time; and
   repeating, based at least in part on the selecting, transmission of the scheduling request using different parameters on the scheduled channel following the expiration of the wait time.

2. The method of claim 1, wherein the first data message and the scheduling request for the first data message are transmitted simultaneously.

3. The method of claim 1, further comprising:
   receiving the ACK message for the first data message subsequent to transmitting the scheduling request.

4. The method of claim 1, further comprising:
   receiving the transmission grant in response to transmitting the scheduling request; and
   retransmitting the first data message on the scheduled channel according to the transmission grant.

5. The method of claim 1, further comprising:
   repeating transmission of the scheduling request for the first data message on the scheduled channel in accordance with at least one of: contemporaneously with repeating transmission of the first data message or a scheduling request transmission periodicity.

6. The method of claim 5, wherein transmitting the first data message on the contention-based channel and repeating transmission of the first data message on the contention-based channel are performed using different transmission parameters.

7. The method of claim 1, further comprising:
   receiving the ACK message for the first data message;
   receiving the transmission grant in response to transmitting a request for transmission of a second data message; and
   transmitting the second data message on the scheduled channel according to the transmission grant, wherein the request for transmission of the second data message is transmitted as part of the first data message on the contention-based channel.

8. The method of claim 1, wherein the scheduled channel is a narrow-band channel.

9. The method of claim 1, wherein the first data message on the contention-based channel comprises at least one of: an orthogonal frequency division multiple access (OFDMA) transmission, a code division multiple access (CDMA) transmission, or a spatial division multiple access (SDMA) transmission.

10. The method of claim 1, wherein the contention-based channel at least partially overlaps, in time or frequency, a channel available for scheduled transmissions.

11. The method of claim 1, wherein the contention-based channel does not overlap, in time or frequency, a channel available for scheduled transmissions.

12. A method for wireless communication, comprising:
   transmitting a scheduling request on a scheduled channel, the scheduling request being transmitted prior to determining whether an acknowledgment (ACK) message has been received;
   determining whether an acknowledgment (ACK) message has been received;
   determining whether a transmission grant has been received based at least in part on transmitting the scheduling request;
   selecting whether to repeat transmission of the scheduling request on the scheduled channel based at least in part on an expiration of a wait time, the selecting based at least in part on whether the ACK message and the transmission grant have been received before the expiration of the wait time; and
   repeating, based at least in part on the selecting, transmission of the scheduling request on the scheduled channel following expiration of the wait time.

13. An apparatus for wireless communication, comprising:
- means for transmitting a first data message on a contention-based channel;
- means for scheduling request for the first data message on a scheduled channel, the scheduling request being transmitted prior to determining whether an acknowledgment (ACK) message has been received for the first data message;
- means for determining whether the ACK message has been received for the first data message;
- means for determining whether a transmission grant has been received based at least in part on transmitting the scheduling request for the first data message;
- means for selecting whether to repeat transmission of the scheduling request using different parameters on the scheduled channel or to repeat transmission of the first data message on the contention-based channel based at least in part on an expiration of a wait time, wherein the wait time commences based at least in part on one of transmitting the first data message or transmitting the scheduling request, the selecting based at least in part on whether the ACK message and the transmission grant have been received before the expiration of the wait time; and
- means for based at least in part on the selecting, transmission of the scheduling request using different parameters on the scheduled channel following the expiration of the wait time.

14. The apparatus of claim 13, wherein the first data message and the scheduling request for the first data message are transmitted simultaneously.

15. The apparatus of claim 13, further comprising:
- means for receiving the ACK message for the first data message subsequent to transmitting the scheduling request.

16. The apparatus of claim 13, further comprising means for receiving the transmission grant in response to transmitting the scheduling request; and means for retransmitting the first data message on the scheduled channel according to the transmission grant.

17. The apparatus of claim 13, further comprising:
- means for repeating transmission of the scheduling request for the first data message on the scheduled channel in accordance with at least one of: contemporaneously with repeating transmission of the first data message or a scheduling request transmission periodicity.

18. The apparatus of claim 17, wherein the means for transmitting the first data message on the contention-based channel and the means for repeating transmission of the first data message on the contention-based channel use different transmission parameters.

19. The apparatus of claim 13, further comprising:
- means for receiving the ACK message for the first data message;
- means for receiving the transmission grant in response to transmitting a request for transmission of a second data message; and
- means for transmitting the second data message on the scheduled channel according to the transmission grant, wherein the request for transmission of the second data message is transmitted as part of the first data message on the contention-based channel.

20. The apparatus of claim 13, wherein the scheduled channel is a narrow-band channel.

21. The apparatus of claim 13, wherein the first data message on the contention-based channel comprises at least one of:
- an orthogonal frequency division multiple access (OFDMA) transmission, a code division multiple access (CDMA) transmission, or a spatial division multiple access (SDMA) transmission.

22. The apparatus of claim 13, wherein the contention-based channel at least partially overlaps, in time or frequency, a channel available for scheduled transmissions.

23. The apparatus of claim 13, wherein the contention-based channel does not overlap, in time or frequency, a channel available for scheduled transmissions.

24. An apparatus for wireless communication, comprising:
- a processor;
- memory in electronic communication with the processor; and
- instructions stored in the memory, the instructions being executable by the processor to:
  - transmit a first data message on a contention-based channel;
  - transmit a scheduling request for the first data message on a scheduled channel, the scheduling request being transmitted prior to determining whether an acknowledgment (ACK) message has been received for the first data message;
  - determine whether the ACK message has been received for the first data message;
  - determine whether a transmission grant has been received based at least in part on transmitting the scheduling request for the first data message;
  - select whether to repeat transmission of the scheduling request using different parameters on the scheduled channel or to repeat transmission of the first data message on the contention-based channel based at least in part on an expiration of a wait time, wherein the wait time commences based at least in part on one of transmitting the first data message or transmitting the scheduling request, the selecting based at least in part on whether the ACK message and the transmission grant have been received before the expiration of the wait time; and
  - repeat, based at least in part on the selecting, transmission of the scheduling request using different parameters on the scheduled channel following the expiration of the wait time.

25. The apparatus of claim 24, wherein the first data message and the scheduling request for the first data message are transmitted simultaneously.

26. The apparatus of claim 24, wherein the instructions are executable by the processor to:
- receive the ACK message for the first data message subsequent to transmitting the scheduling request.

27. The apparatus of claim 24, wherein the instructions are executable by the processor to:
- receive the transmission grant in response to transmitting the scheduling request; and
- retransmit the first data message on the scheduled channel according to the transmission grant.

28. The apparatus of claim 24, wherein the instructions are executable by the processor to:
- repeat transmission of the scheduling request for the first data message on the scheduled channel in accordance with at least one of: contemporaneously with repeating transmission of the first data message or a scheduling request transmission periodicity.

29. The apparatus of claim 28, wherein the instructions executable by the processor to transmit the first data message on the contention-based channel and the instructions executable by the processor to repeat transmission of the first data message on the contention-based channel use different transmission parameters.

30. The apparatus of claim 24, wherein the instructions are executable by the processor to:
receive the ACK message for the first data message;
receive the transmission grant in response to transmitting a request for transmission of a second data message; and
transmit the second data message on the scheduled channel according to the transmission grant, wherein the request for transmission of the second data message is transmitted as part of the first data message on the contention-based channel.

31. The apparatus of claim 24, wherein the scheduled channel is a narrow-band channel.

32. A non-transitory computer-readable medium storing computer-executable code for wireless communication, the code executable by a processor to:
transmit a first data message on a contention-based channel;
transmit a scheduling request for the first data message on a scheduled channel, the scheduling request being transmitted prior to determining whether an acknowledgment (ACK) message has been received for the first data message;
determine whether the ACK message has been received for the first data message;
determine whether a transmission grant has been received based at least in part on transmitting the scheduling request for the first data message;
select whether to repeat transmission of the scheduling request using different parameters on the scheduled channel or to repeat transmission of the first data message on the contention-based channel based at least in part on an expiration of a wait time, wherein the wait time commences based at least in part on transmitting the first data message, the selecting based at least in part on whether the ACK message and the transmission grant have been received before the expiration of the wait time; and
repeat, based at least in part on the selecting, transmission of the scheduling request using different parameters on the scheduled channel following the expiration of the wait time.

33. The non-transitory computer-readable medium of claim 32, wherein the code is executable by the processor to:
receive the ACK message for the first data message subsequent to transmitting the scheduling request.

34. The non-transitory computer-readable medium of claim 32, wherein the code is executable by the processor to:
receive the transmission grant in response to transmitting the scheduling request; and
retransmit the first data message on the scheduled channel according to the transmission grant.

\* \* \* \* \*